United States Patent
Kawai et al.

[11] Patent Number: 6,073,456
[45] Date of Patent: Jun. 13, 2000

[54] AIR-CONDITIONING DEVICE FOR HYBRID VEHICLE

[75] Inventors: Takayoshi Kawai, Hoi-gun; Hiroshi Nonoyama, Toyota; Toshihiko Muraki, Kariya; Yuji Takeo, Toyoake; Makoto Mimoto, Chita-gun; Eizo Hayashi, Nishikamo-gun; Takayoshi Matsuno, Okazaki, all of Japan

[73] Assignees: Denso Corporation, Kariya; Toyota Jidosha Kabushiki Kaisha, Toyota, both of Japan

[21] Appl. No.: 09/167,260

[22] Filed: Oct. 6, 1998

[30] Foreign Application Priority Data

| Oct. 9, 1997 | [JP] | Japan | 9-276706 |
| Oct. 13, 1997 | [JP] | Japan | 9-278423 |
| Jun. 19, 1998 | [JP] | Japan | 10-172436 |
| Jun. 30, 1998 | [JP] | Japan | 10-184144 |

[51] Int. Cl.[7] .................................................. B60H 1/00
[52] U.S. Cl. ........................... 62/133; 62/229; 62/243
[58] Field of Search ...................... 62/133, 229, 227, 62/228.1, 228.3, 228.4, 228.5, 208, 209, 236, 243

[56] References Cited

U.S. PATENT DOCUMENTS

| 4,102,150 | 7/1978 | Kountz | 62/229 X |
| 4,494,383 | 1/1985 | Nagatomo et al. | 62/229 X |
| 4,748,819 | 6/1988 | Takahashi | 62/227 X |

FOREIGN PATENT DOCUMENTS

| 4-50026 | 2/1992 | Japan . |
| 4-59430 | 2/1992 | Japan . |
| 5-328521 | 12/1993 | Japan . |
| 6-286459 | 10/1994 | Japan . |

Primary Examiner—Harry B. Tanner
Attorney, Agent, or Firm—Harness, Dickey & Pierce, PLC

[57] ABSTRACT

An air-conditioning device includes a control system for saving fuel consumed to drive the device and for enhancing comfortability of passengers at the same time. The air-conditioning device is operated under a cooling mode emphasizing comfortability or under an economy mode emphasizing fuel economy. Under the cooling mode, the device is controlled in a lower temperature range. Under the economy mode, the device is controlled in an intermediate temperature range to secure comfortability when cooling-down is required, and in a higher temperature range to save fuel after the cooling-down has been completed. Information on vehicle speed may be used in the control under the economy mode. The device may be turned off or controlled in a higher temperature range to save fuel, especially when the vehicle comes to a halt. Frost on a windshield which develops when the vehicle is at a halt for a certain period without operating air-conditioning device is avoided by operating the device at a lower temperature, only when such condition exists. Such condition may be detected by a humidity sensor installed in the passenger compartment.

34 Claims, 17 Drawing Sheets

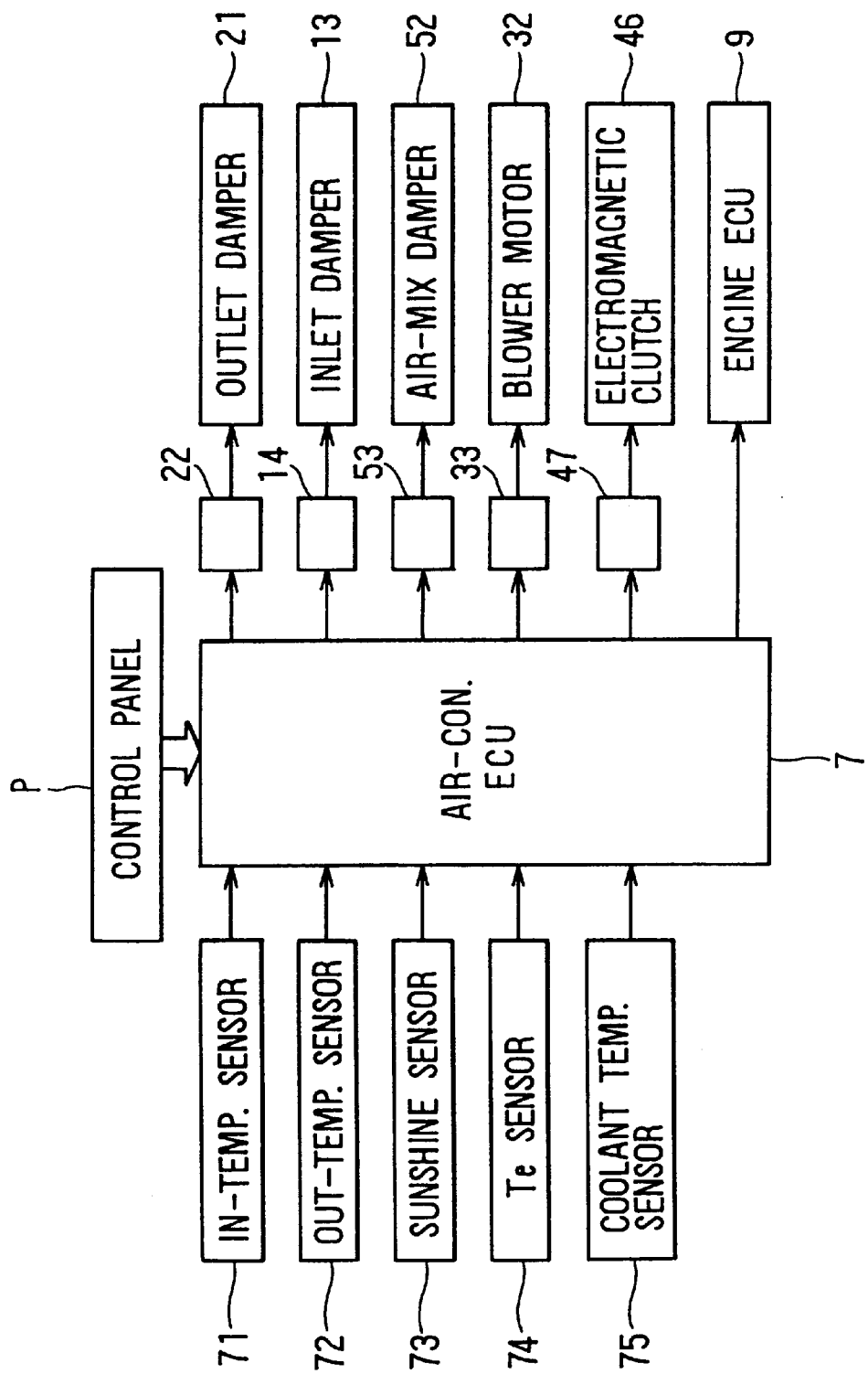

AIR-CONDITIONING DEVICE FOR HYBRID
VEHICLE

CROSS-REFERENCE TO RELATED APPLICATIONS

This application is based upon and claims benefit of priority of Japanese Patent Applications No. Hei-9-276706 filed on Oct. 9, 1997, No. Hei-9-278423 filed on Oct. 13, 1997, No. Hei-10-172436 filed on Jun. 19, 1998, and No. Hei-10-184144 filed on Jun. 30, 1998, the contents of which are incorporated herein by reference.

BACKGROUND OF THE INVENTION

1. Field of the Invention

The present invention relates to an air-conditioning device for a hybrid vehicle which is driven by an internal combustion engine and an electric motor.

2. Description of Related Art

A hybrid vehicle is usually powered by an electric motor when it is starting and being driven at a low speed, by an internal combustion engine when it is driven at a normal speed, and by both of the motor and the engine when it is being accelerated. Air conditioning devices for such hybrid vehicles are disclosed, for example, in JP-A-6-286459 and JP-A-5-328521. In those conventional air conditioning devices, the engine is automatically started to drive a compressor for an air conditioner when air-conditioning is required, even when the vehicle is powered by the electric motor. Electric power for driving the compressor is saved in this manner. In those devices, however, the engine is compulsorily operated to drive the compressor when the engine power is not necessary to drive the vehicle. Moreover, the engine is operated to drive the compressor even when the vehicle comes to a halt at an intersection, for example. Therefore, fuel is consumed unnecessarily and fuel economy is sacrificed.

To improve the fuel economy, it is conceivable to stop the engine compulsorily when the vehicle comes to a halt at an intersection even if the air conditioning switch is being turned on. If the engine is stopped and the compressor is not driven, the air-conditioner does not function and comfortability of passengers is sacrificed. In addition, condensed water on a surface of an evaporator is evaporated again during a halt of the vehicle, thereby causing frost on a windshield. The more frost will cover the windshield, the longer the vehicle halts.

SUMMARY OF THE INVENTION

The present invention has been made in view of the above-mentioned problems, and an object of the present invention is to provide an air-conditioning device for a hybrid vehicle, which is operated economically without sacrificing passenger's comfortability. Another object of the present invention is to provide an air-conditioning device for an hybrid vehicle, in which frost covering a windshield during a halt of the vehicle is prevented to secure a good sight for a driver.

According to the present invention, the air-conditioning device is operated under a cooling mode or a economy mode, which is selected manually by a passenger or automatically. Under the cooling mode, the air-conditioning device is operated with emphasis on fuel economy, while it is operated with emphasis on passenger's comfortability under the economy mode. Even under the cooling mode, the device is operated without excessively sacrificing fuel economy. Even under the economy mode, much attention is paid to passenger's comfortability. In other words, both fuel economy and comfortability are attained without much sacrificing one of them.

When the air-conditioning device is operated under the cooling mode, a passenger compartment is quickly cooled down to a desired temperature, and that temperature is maintained in such a way that fuel consumption for driving a compressor is minimized. The compressor and the engine are turned off as long as possible and as frequently as possible to minimize their operating ratio.

When the air-conditioning device is operated under the economy mode, it is controlled in different temperature ranges depending on whether cooling-down is required or not. If a difference between a desired temperature and a compartment temperature is larger than a predetermined level (e.g., 5° C.), it is regarded that the cooling down is required. If the difference is smaller than that, it is regarded that the cooling-down is already completed. A temperature sensor for detecting a temperature Te at an immediate downstream of an evaporator which cools down the passenger compartment is provided, and the temperature Te is used to control the device. For example, in the cooling-down process, the compressor is turned on if Te is higher than 13° C. and turned off if Te is lower than 12° C. On the other hand, after the cooling-down process has been completed, the compressor is turned on if Te is higher than 25° C. and turned off if Te is lower than 12° C. This means that the device is operated to attain comfortability without excessively sacrificing fuel economy in the cooling-down process, and is operated to attain fuel economy without excessively sacrificing comfortability after the cooling-down process has been completed.

Moreover, vehicle speed detected by a vehicle speed sensor may be taken into account in controlling the device. Especially, when the vehicle comes to a halt at an intersection, for example, the air-conditioning device is controlled in a higher temperature range to reduce the operating ratio of the engine. Since the engine is not usually operated when the vehicle is at a halt, its operation has to be kept minimum. On the other hand, when the vehicle is driven at a normal speed, the engine is usually operated. Accodingly, the air-conditioning device can be operated in a lower temperature range to enhance comfortability without sacrificing fuel economy too much. For example, the device is operated in a Te range of 12–25° C. when the vehicle is at a halt, while in a Te range of 12–13° C. when the vehicle is driven.

Further, the air-conditioning device is controlled to avoid frost development on a windshield or other windows. A sensor is used for detecting whether there exists a condition under which frost tends to develop on the windshield. A humidity sensor for detecting humidity in the compartment may be used for this purpose. Frost on the windshield tends to develop when the vehicle is at halt for a certain period without air-conditioning. If the frosting condition exists when the vehicle is at halt, the air-conditioning device is turned off at a lower level of Te (for example, at 3° C.) to avoid frosting on the windshield. If there is no frosting condition, the device is turned off at a higher level of Te (for example, at 12° C.) to reduce operating ratio of the engine and to save fuel. It is also possible to control the device so that it is turned on at a lower temperature to avoid frosting after the vehicle has been at halt for a long period (for example, in excess of 90 seconds).

Other objects and features of the present invention will become more readily apparent from a better understanding

BRIEF DESCRIPTION OF THE DRAWINGS

FIG. 3 is a block diagram showing a control system of the air-conditioning device;

DETAILED DESCRIPTION OF THE PREFERRED EMBODIMENTS

Figure 1:
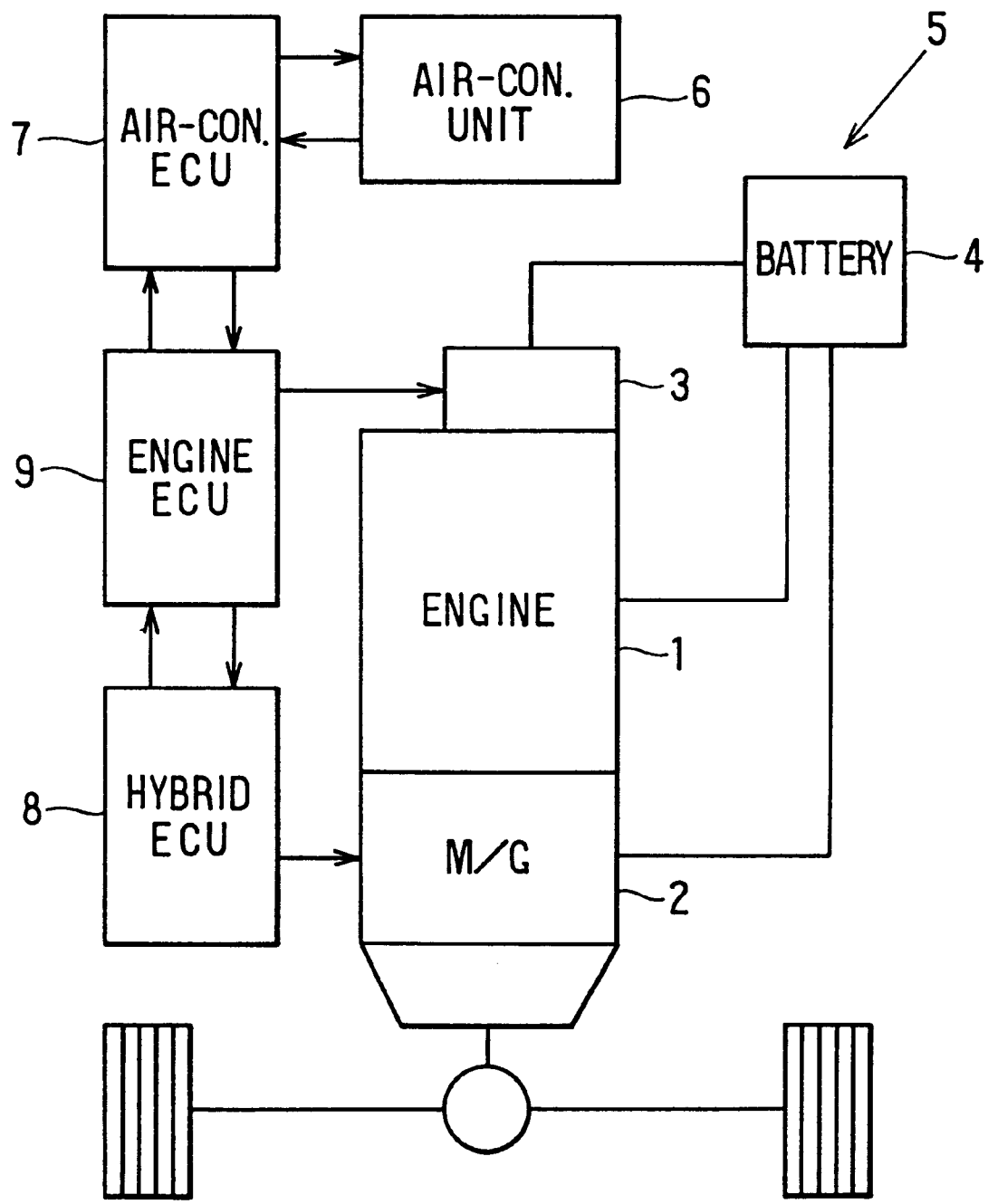
FIG. 1 is a block diagram showing a hybrid vehicle having an air-conditioning device.

Referring to FIGS. 1–8, a first embodiment of the present invention will be described. FIG. 1 shows a block diagram of a hybrid vehicle 5 which includes a air-conditioning device. The hybrid vehicle 5 is driven by an internal combustion engine 1 and a motor-generator 2 powered by a on-board battery 4. A starting device 3 including a starter motor and an ignitor is connected to the engine 1. The engine 1 is controlled by an engine ECU (electronic control unit) 9, and the motor-generator 2 is controlled by a hybrid ECU. The air-conditioning device is composed of an air-conditioner unit 6 and an air-conditioner ECU 7 which controls operation of the air-conditioner unit 6. The air-conditioning device automatically controls temperature and humidity in a passenger compartment of the hybrid vehicle. Three ECUs communicate with one another.

The engine 1 and the motor-generator 2 are connected to a drive axle of the vehicle through an engagement-disengagement coupler, so that the hybrid vehicle 5 is driven either by the engine 1 or the motor-generator 2, or both. The starting device 3 is controlled by the engine ECU 9 so that combustion efficiency of the engine 1 becomes optimum. The engine 1 is operated when the hybrid vehicle 5 is driven at a normal speed and when battery charging is required.

Figure 2:
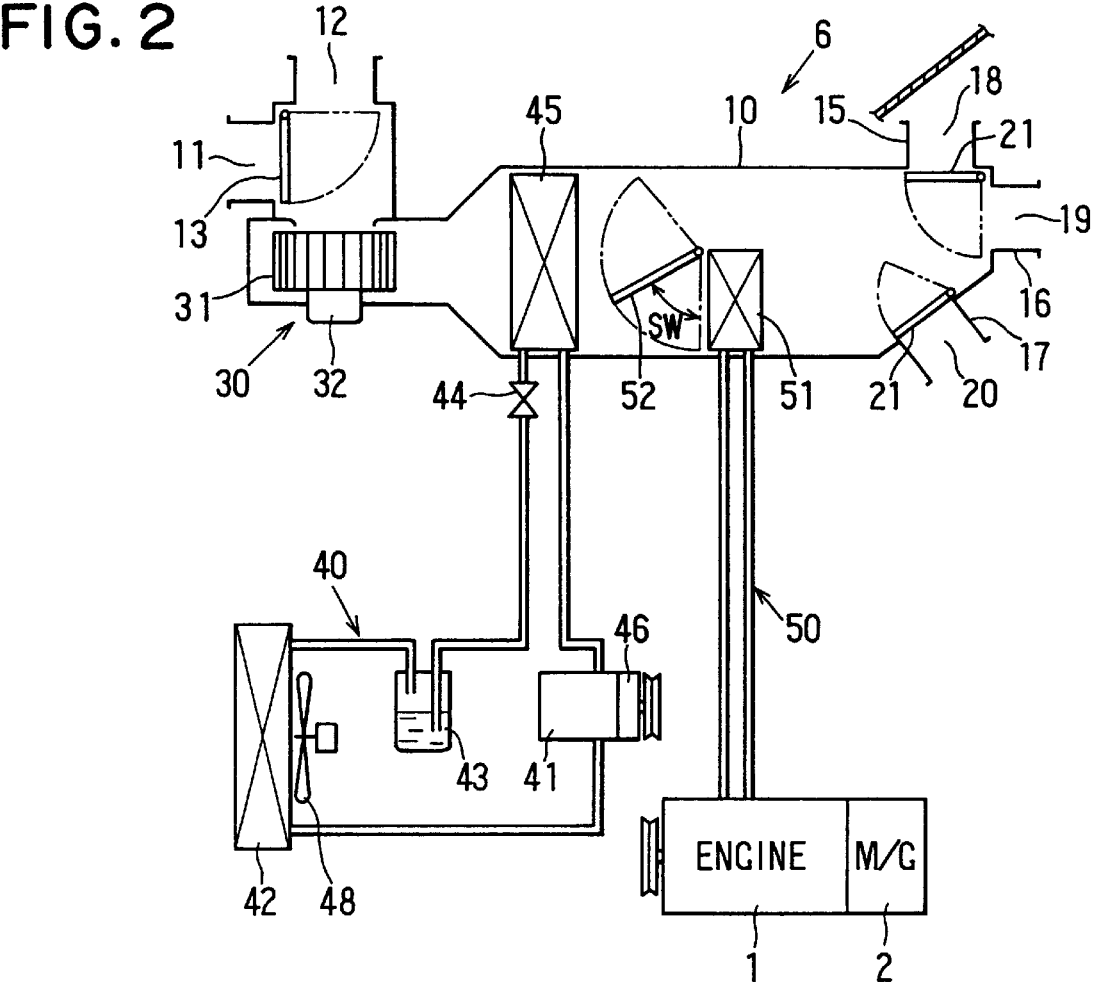
FIG. 2 is a block diagram showing an air-conditioning device for a hybrid vehicle.

Referring to FIG. 2, the air-conditioner unit 6 is composed of an air duct 10 for leading air-conditioned air into a passenger compartment, a centrifugal blower 30 for generating air flow in the air duct 10, a refrigerating cycle 40 for cooling air flowing in the air duct 10, and a coolant circuit 50 for heating air in the air duct 10. The air duct 10 is placed at a front portion of the passenger compartment. An inlet switching box having an inside air inlet 11, an outside air inlet 12 and an inlet damper 13 is located at the upstream of the air duct 10. The inlet damper 13 is driven by an actuator 14 (shown in FIG. 3) to switch inlet modes between an inside air mode (for introducing air from the compartment into the air duct 10) and an outside air mode (for introducing air from the outside into the air duct 10).

An outlet switching box having a defroster duct 15, a face duct 16, a foot duct 17 and two outlet dampers 21 is located at the downstream of the air duct 10. The defroster duct 15 forms a defroster outlet 18 from which hot air is blasted toward a windshield. The face duct 16 forms a face outlet 19 from which cool air is blasted toward a face of a passenger. One of the outlet dampers 21 switches outlets between the defroster outlet 18 and the face outlet 19. The foot duct 17 forms a foot outlet 20 from which mostly hot air is blasted toward feet of a passenger. The foot outlet 20 is opened or closed by another outlet damper 21. The outlet dampers 21 are driven by respective actuators 22 (shown in FIG. 3), and outlet modes are switched among a face mode, a bi-level mode (air is sent from both face and foot outlets 19, 20), a foot mode, a foot/defroster mode (air is sent from both foot and defroster outlets 20, 18), and a defroster mode.

The centrifugal blower 30 having a blower 31 and a blower motor 32 is disposed in a case formed integrally with the air duct 10. The blower motor 32 is controlled by a blower driving circuit 33 (shown in FIG. 3) by changing voltage applied thereto.

The refrigerating cycle 40 is composed of a compressor 41 driven by the engine 1 through a belt to compress refrigerant, a condenser 42 for condensing the refrigerant, a receiver 43 for separating liquid refrigerant from vapor refrigerant, an expansion valve 44 for expanding the compressed liquid refrigerant, an evaporator 45 for evaporating the expanded refrigerant, and connecting pipes for connecting those components to form the refrigerating cycle 40. The evaporator 45 is installed in the air duct 10 as shown in FIG. 2, and cools down the air flowing therethrough and decreases humidity in the air. An electromagnetic clutch 46 is attached to the compressor 41 to connect or disconnect driving force from the engine 1. The electromagnetic clutch 46 is controlled by a clutch driving circuit 47 (shown in FIG. 3).

The compressor 41 is driven by the engine 1 when the electromagnetic clutch 46 is energized (ON), and the refrigerant cycle 40 performs its function. The compressed refrigerant supplied to the refrigerant cycle 40 varies depending on rotational speed of the compressor 41. When the electromagnetic clutch 46 is deenergized (OFF), the compressor 41 is disengaged from the engine 1, and the operation of the refrigerant cycle 40 stops. The condenser 42 is installed on the hybrid vehicle 5 at a place where it receives air flow generated when the vehicle is driven. The condenser 42 is cooled down by the air flow from the outside of the vehicle which is further accelerated by a cooling fan 48.

The coolant circuit 50 circulates coolant which is heated in a water jacket of the engine 1. The coolant is also cooled by a radiator having a thermostat (both not shown in FIG. 2). The hot coolant is supplied to the heater core 51 which is located in the air duct 10 to heat the air therein as shown in FIG. 2. The heater core 51 is disposed in the air duct 10 so that it partially closes an air passage in the air duct 10. An air-mix damper 52 is disposed in the air duct 10 to close or open the air passage above the heater core 51. The degree of its opening "SW" is controlled by an actuator 53 (shown in FIG. 3), so that amount of air flowing through the heater core 51 is adjusted.

Figure 4:
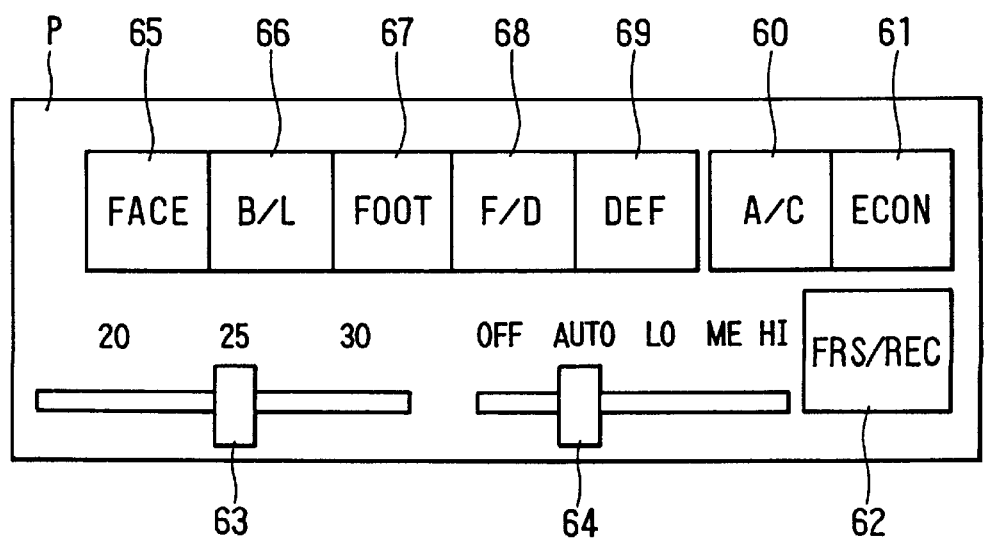
FIG. 4 is a schematic view showing a control panel for the air-conditioning device.

Referring to FIGS. 1, 3 and 4, a control process of the air-conditioning device will be explained. The air-conditioner ECU 7 receives signals sent from the engine ECU 9, switches on a control panel P shown in FIG. 4, and various sensors. The control panel P shown in FIG. 4 is located in front of the passenger compartment and includes various switches: an air-conditioner switch (A/C) 60 for demanding operation of the compressor 41, an economy switch (ECON) 61 for indicating an economical operation of the air-conditioner device, an inlet mode switch (FRS/REC) 62 for switching inlet modes, a temperature setting switch 63 for setting temperature in the passenger compartment at a desired level, an air amount control lever 64 for controlling the amount of air blown from the centrifugal blower 30, and switches 65–69 for changing the outlet modes. When the A/C switch is on (cooling mode), the compressor 41 is turned on at Te=4° C. (the temperature "Te" is measured at an immediate downstream of the evaporator 45) and turned off at 3° C. When the ECON switch is on (economy mode), the compressor 41 is turned on at 13° C. and turned off at 12° C. The way of switching between the cooling mode and the economy mode is not limited to the A/C and ECON switches, but it may be performed by other ways.

The switches 65–69 change the outlet modes, respectively. When FACE switch 65 is on, the face outlet 19 is open; when B/L switch 66 is on, outlet air is blown from both outlets 19 and 20; when FOOT switch 67 is on, the foot outlet is open; when F/D switch 68 is on, air is blown from both outlets 18 and 19; when DEF switch 69 is on, the defroster outlet 18 is open.

As shown in FIG. 3, various sensors 71–75 are connected to and send respective signals to the air-conditioner ECU 7. An in-temp sensor 71 senses compartment temperature, an out-temp sensor 72 senses temperature outside the vehicle, a sunshine sensor 73 senses amount of sunshine in the compartment, a Te sensor 74 senses temperature at an immediate downstream of the evaporator 45, a coolant temp sensor 75 senses temperature of coolant flowing into the heater core 51. Air-conditioning load is detected by the in-temp sensor 71, the out-temp sensor 72, the sunshine sensor 73 and the coolant temp sensor 75. A temperature sensing element such as a thermistor is used in those temperature sensors. The air-conditioner ECU 7 includes a microcomputer having a CPU, ROM and RAM. Signals sent from the sensors 71–75 are fed to the microcomputer after they are converted from analog signals to digital signals by an input circuit included in the air-conditioner ECU 7. Power to operate the air-conditioner ECU 7 is supplied from the on-board battery 4 when an ignition switch of the hybrid vehicle 5 is turned on.

The engine ECU 9 also includes a microcomputer having a CPU, ROM and RAM. Signals sent from sensors such as a speedometer and an engine rotational speed sensor are fed to the microcomputer after they are converted from analog signals to digital signals.

Figure 5:
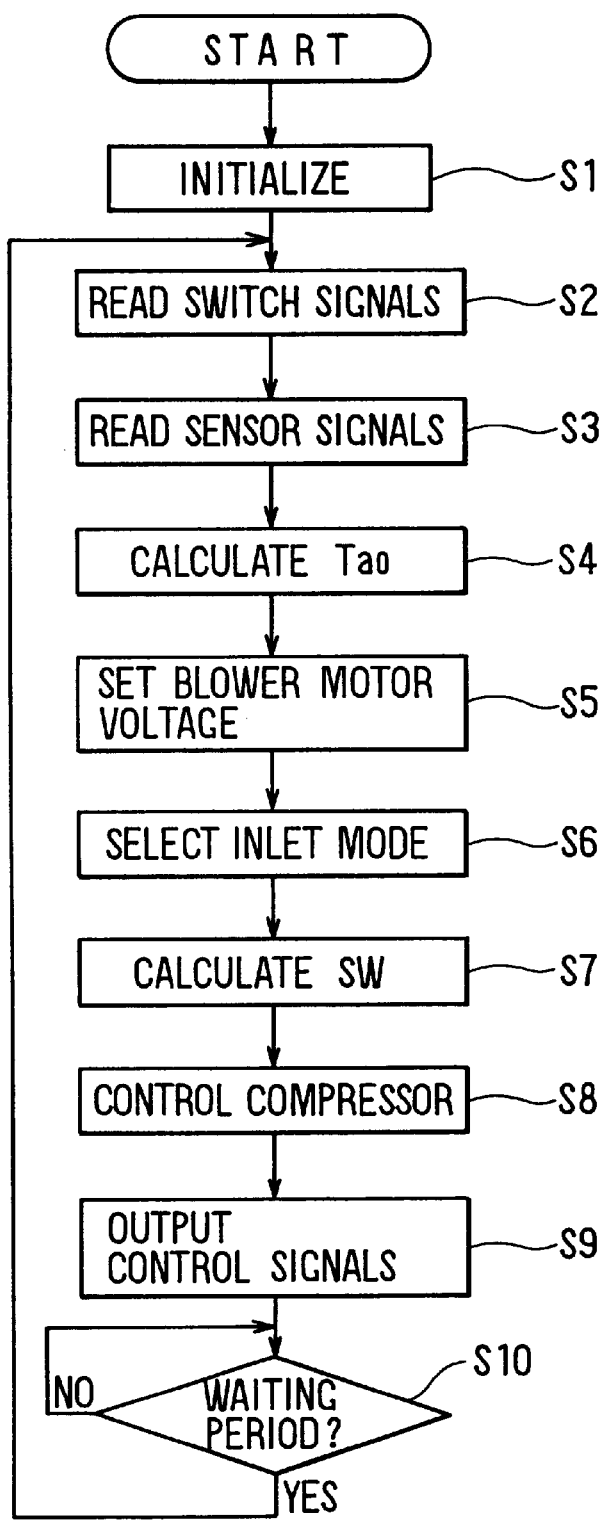
FIG. 5 is a flowchart showing a basic control process by an air-conditioner ECU.

Now, referring to FIGS. 5–8, a control process by the air-conditioner ECU 7 will be described. FIG. 5 shows a flowchart of a basic control process. Upon turning on the ignition switch, power is supplied to the air-conditioner ECU 7 from the battery 4 and the routine shown in FIG. 5 starts. The air-conditioner ECU 7 is initialized at step S1, and then signals sent form switches of the control panel P are read at step S2. The signals sent from sensors 71–75 are converted to digital signals and read by the ECU 7 at step S3. Then, a target temperature "Tao" of the air blown into the passenger compartment is calculated according to a following formula stored in the ROM at step S4.

$$Tao = Kset \cdot Tset - Kr \cdot Tr \cdot Kam \cdot Tam - Ks \cdot Ts + C,$$

where Tset is a desired temperature set by the temperature setting lever 63, Tr is a compartment temperature detected by the in-temp sensor 71, Tam is an atmospheric temperature detected by the out-temp. sensor 72, and Ts is an amount of sunshine detected by the sunshine sensor 73. Kset, Kr, Kam and Ks are respective gains, and C is a correction constant.

Figure 6:
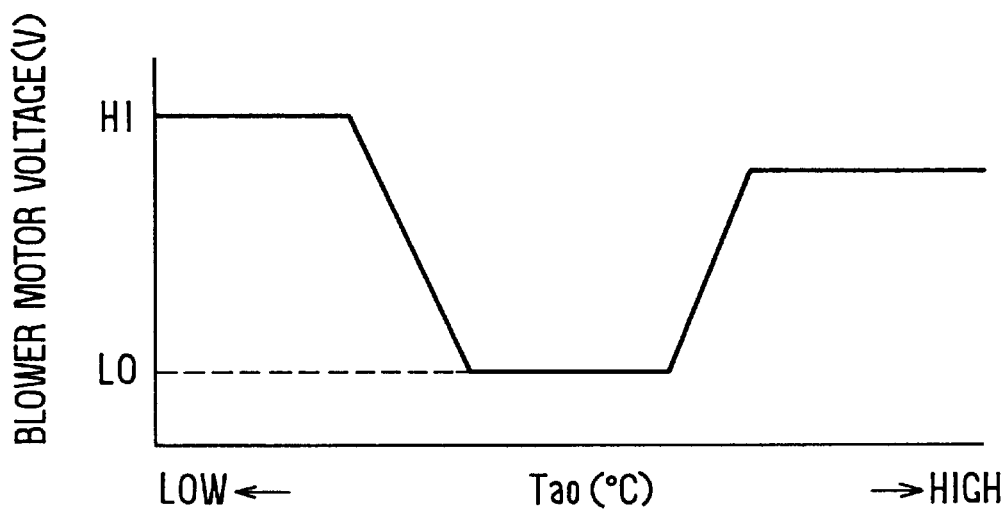
FIG. 6 is a graph showing a relation between target temperature and blower motor voltage.
Figure 7:
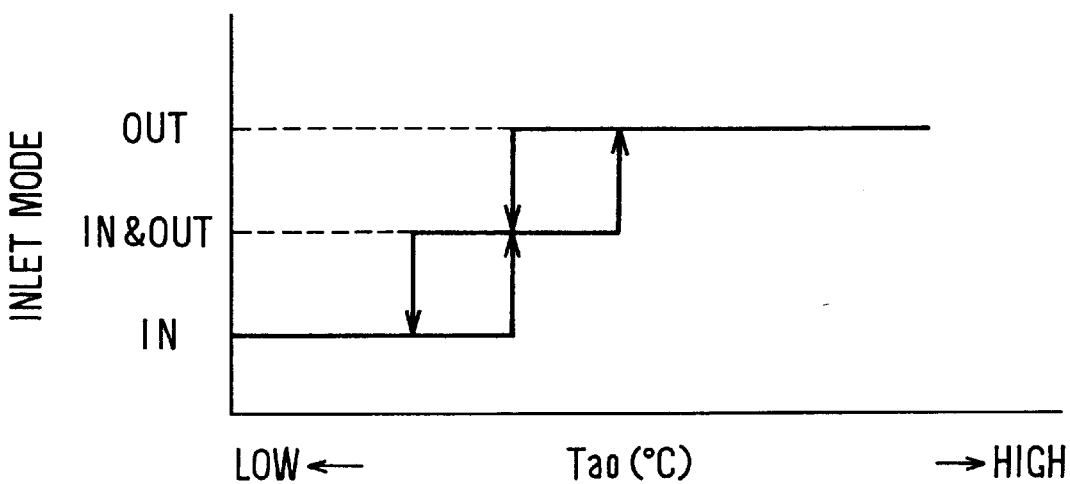
FIG. 7 is a graph showing a relation between the target temperature and inlet modes.

Then, at step S5, a voltage to be applied to the blower motor 32 corresponding to the target temperature Tao is set according to a map (shown in FIG. 6) stored in the ROM. In the map of FIG. 6, the target temperature Tao is shown on the abscissa, and the blower voltage is shown on the ordinate. HI and LO on the ordinate mean the highest voltage and the lowest voltage applied to the blower motor 32, respectively. At step S6, the inlet mode (outside, inside or in/out mode) is selected according to a map (shown in FIG. 7) stored in the ROM. As the target temperature Tao becomes higher, the inlet mode is changed from the inside mode to the in/out mode and then to the outside mode. On the contrary, as the target temperature Tao becomes lower, the inlet mode is changed in a reverse order with a certain hysteresis as shown in FIG. 7. When the inside mode is selected, the inlet damper 11 (shown in FIG. 2) closes the outside air inlet 12 and opens the inside air inlet 11. When the in/out mode is selected, the inlet damper 11 takes an intermediate position to suck air from both inlets 11 and 12. When the outside mode is selected, the inlet damper 11 closes the inside air inlet 11 and opens the outside air inlet 12 to suck air from the outside air inlet 12. The outlet modes (FACE, B/L, FOOT, F/D and DEF shown in FIG. 4) are selected by turning on the respective switches of the control panel P.

Then, at step S7, the opening degree SW of the air-mix damper 52 is calculated according to the following formula stored in the ROM.

$$SW = \{(Tao - Te)/(Tw - Te)\} \times 100\%,$$

where Tw is a coolant temperature detected by the coolant temp. sensor 75, and Te is a temperature at an immediate downstream of the evaporator 45 measured by the Te sensor 74. When SW is calculated as SW≦0%, the air-mix damper 52 closes the front surface of the heater core 51, and a whole air flow through the evaporator 45 is sent to the outlet of the air duct 10 (a maximum-cool position). When SW is calculated as SW≧100%, the air-mix damper 52 fully opens the passage through the heater core 51, and a whole air flow sent from the evaporator 45 flows through the heater core 51 (a maximum-hot position). When SW is calculated as between 0% and 100%, the air-mix damper 52 takes intermediate positions according to the value of SW, and cool air from the evaporator 45 partially flows through the heater core 51 and the rest directly to the outlet.

Then, at step 8, the compressor 41 is controlled according to a routine shown in FIG. 8, details of which will be explained later. At step 9, the air-conditioner ECU 7 delivers output signals which have been selected or calculated at the preceding steps S4–S8 to the actuators 14, 22, 53, and driving circuits 33, 47. Further, the air-conditioner ECU 7 sends signals to the engine ECU 9 for starting the engine 1 (engine ON signal) or stopping the engine 1 (engine OFF signal). At the final step S10, the control process waits lapse of a predetermined control cycle time, for example, 0.5 to 2.5 sec, and then returns to step S2.

Figure 8:
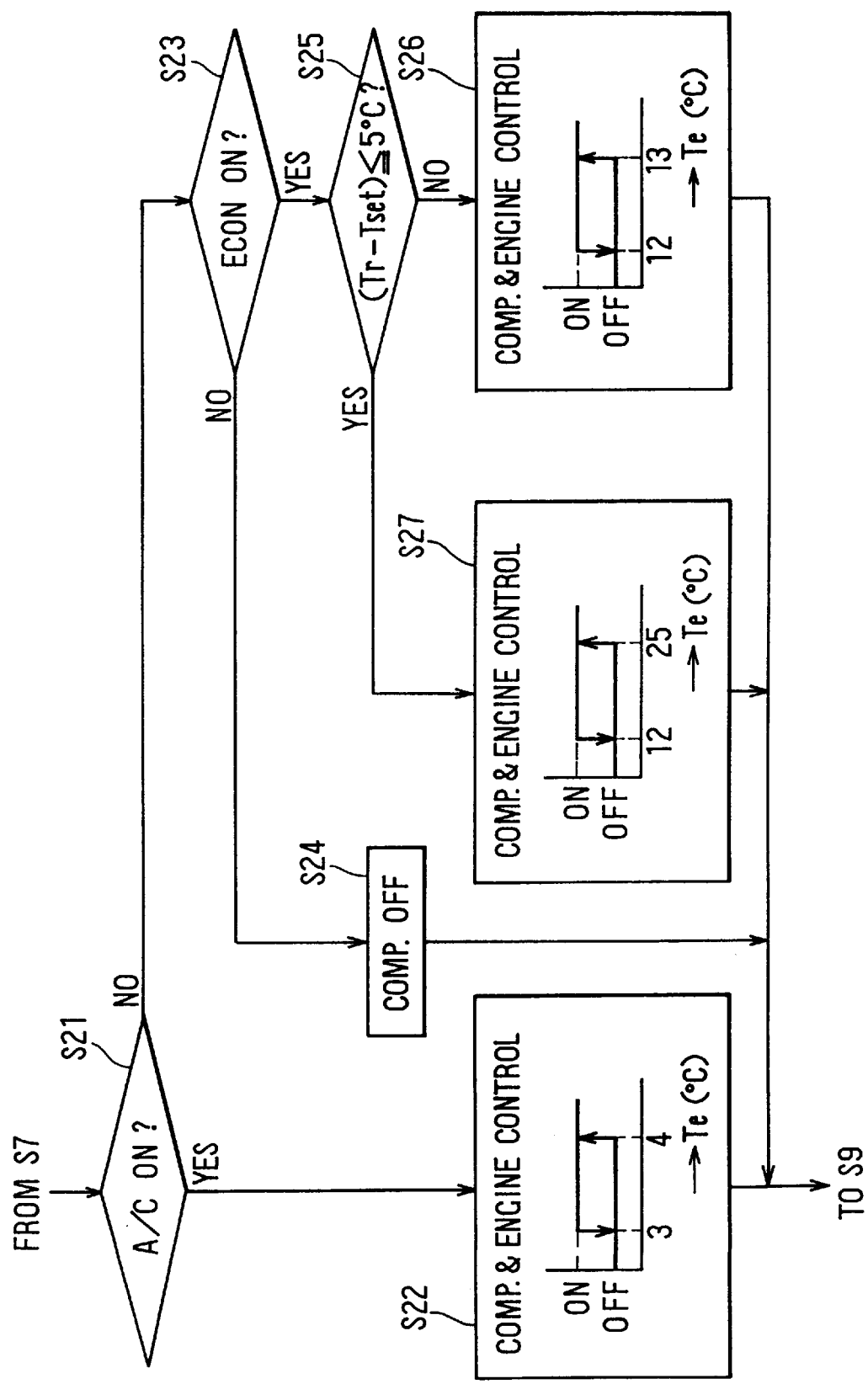
FIG. 8 is a flowchart showing a compressor control process by an air-conditioner ECU in a first embodiment of the present invention.

Referring to FIG. 8, the compressor control process will be described. At the first step S21, it is judged whether the A/C switch 60 is on or not. If the answer is YES, the routine moves to step S22 where operation of the engine 1 and compressor 41 are decided according to the temperature Te. That is, if the temperature Te is higher than 4° C. (first frosting temperature), the electromagnetic clutch 46 is energized to engage the compressor 41 with the engine 1 and a signal to start the engine 1 is delivered. If the temperature Te is lower than 3° C. (second frosting temperature), the electromagnetic clutch 46 is deenergized to disengage the compressor 41 from the engine 1 and a signal to stop the engine 1 is delivered. In short, the air conditioner becomes ON if Te is higher than 4° C. and OFF if Te is lower than 3° C.

If the answer from step S21 is NO (A/C switch is not ON), the routine moves to step S23 where whether the economy switch 61 (ECON) is ON or not is judged. If the answer is NO, the routine moves to step S24 where a signal to stop the compressor 41 is delivered. If the answer from step S23 is YES, the routine moves to step S25 where whether a difference between the compartment temperature and the desired temperature is smaller than 5° C. (Tr−Tset ≦5° C.) is judged. If the answer from step S25 is NO (if cooling-down is still needed), the routine moves to step S26 where the operation of the compressor 41 and the engine 1 are controlled according to the temperature Te. That is, if Te is higher than 13° C. (first turn-on temperature), the compressor is turned on and a signal to operate the engine is delivered. If Te is lower than 12° C. (turn-off temperature), the compressor is turned off and a signal to stop the engine is delivered. If the answer from step S25 is YES, the routine moves to step S27 where the compressor is turned on if Te is higher than 25° C. (second turn-on temperature) and a signal to operate the engine is delivered. If Te is lower than 12° C. (turn-off temperature), the compressor is turned off and a signal to stop the engine is delivered. The controls at steps S26 and S27 are performed according to maps stored in the ROM. Thus, the routine at step S8 is completed and the control process moves to step S9.

As described above, when the A/C switch is ON (cooling mode), the passenger compartment can be cooled down quickly to the desired temperature level, and that level is maintained by intermittently operating the air conditioner unit. Therefore, comfortability can be attained without consuming fuel excessively. When the ECON switch is ON (economy mode), the control level of temperature Te is set higher to save fuel. Moreover, the control level of Te is changed according to the difference between the desired temperature (Tset) and the compartment temperature (Tr). That is, if cooling-down is required, the control level of Te is set lower (12–13° C.), while it is set higher (12–25° C.), if cooling down is not necessary. In this manner, fuel to operate the air conditioner device is greatly saved without sacrificing comfortability of passengers, especially when the ECON switch is ON.

Figure 9:
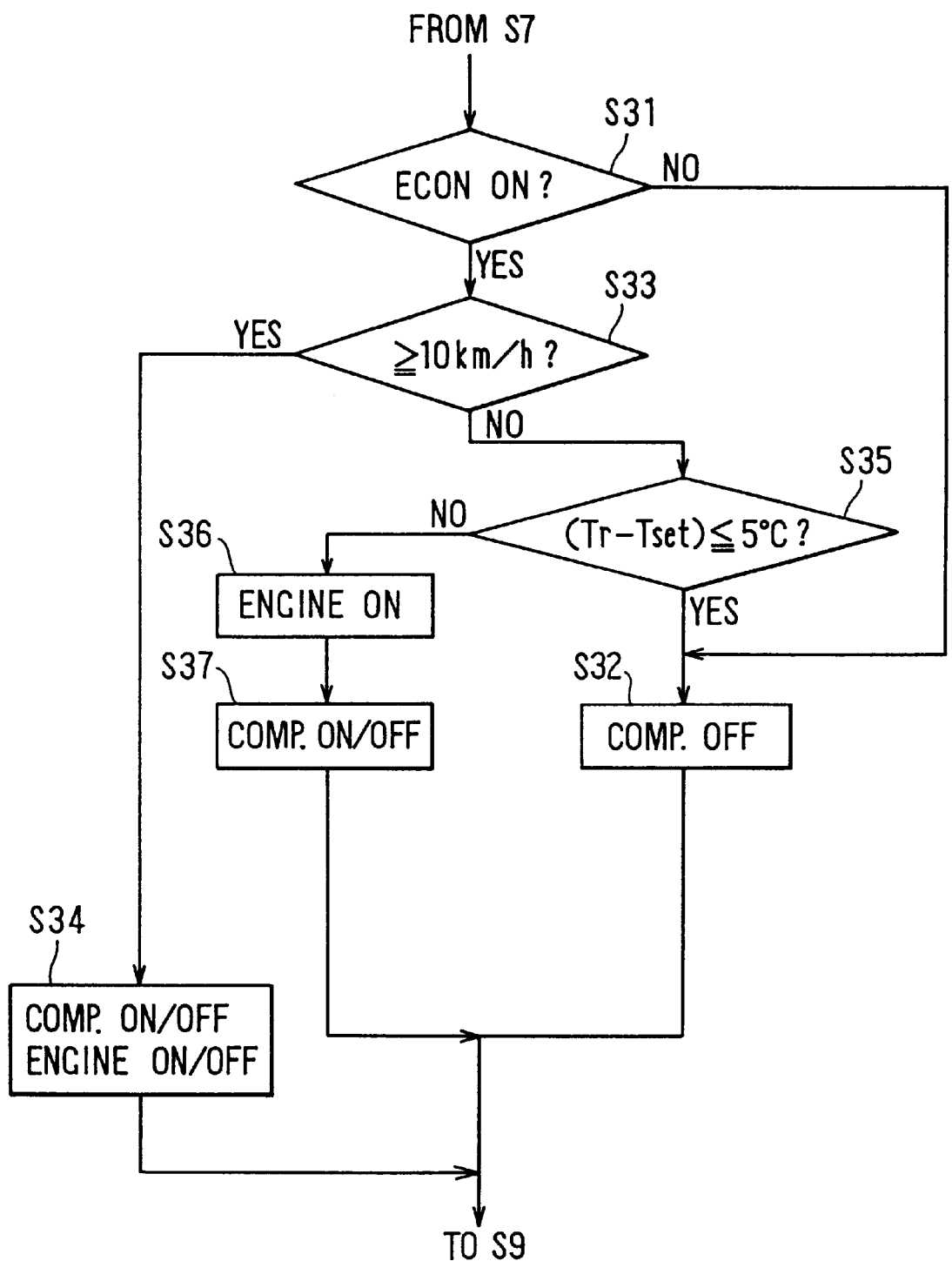
FIG. 9 is a flowchart showing a compressor control process by an air-conditioner ECU in a second embodiment of the present invention.

Referring to FIG. 9, a second embodiment of the present invention will be described. In this embodiment, a signal representing vehicle speed is additionally used in the control process of the compressor. Step S31 judges whether the ECON switch is ON or not. If the ECON switch is not ON, the routine moves to step S32 where the compressor 41 is turned off by deenergizing the electromagnetic clutch 46. If the ECON switch is ON, the routine moves to step S33 where it is judged whether the vehicle speed exceeds a predetermined speed, for example, 10 km/h. If the answer is YES, the routine moves to step S34 where the compressor and the engine is controlled according to the temperature Te. That is, if Te is higher than 13° C., the compressor is turned on and a signal to operate the engine is delivered. If Te is lower than 12° C., the compressor is turned off and a signal to stop the engine is delivered.

If the answer from step S33 is NO (the engine speed is lower than the predetermined speed), the routine moves to step S35 where it is judged whether cooling-down is needed or not (whether a difference between the compartment temperature Tr and the desired temperature Tset is smaller than 5° C.). If the answer is YES (cooling-down is not needed), the routine moves to step S32 where the compressor is turned off. If the answer from step S35 is NO (cooling-down is needed), then the routine moves to step S36 where a signal to turn on the engine is delivered. Then, the routine moves to step S37 where the compressor is controlled according to the temperature Te. That is, the compressor is turned on if Te is higher than the first turn-on temperature and turned off if Te is lower than the turn-off temperature. Then, the control process moves to the next step S9.

In the second embodiment, information regarding the vehicle speed is utilized. When the hybrid vehicle is driven at a speed higher a predetermined level, for example, 40 km/h, the engine is operated anyway regardless of whether the compressor is operated or not. Therefore, if the compressor is turned off under this situation, fuel saving is not so remarkable. On the other hand, if the vehicle speed is low, the engine is usually not operated and the vehicle is driven by the motor-generator. Under this situation, the operation of the compressor which is driven by the engine is more strictly controlled to attain a high degree of fuel saving.

Figure 10:
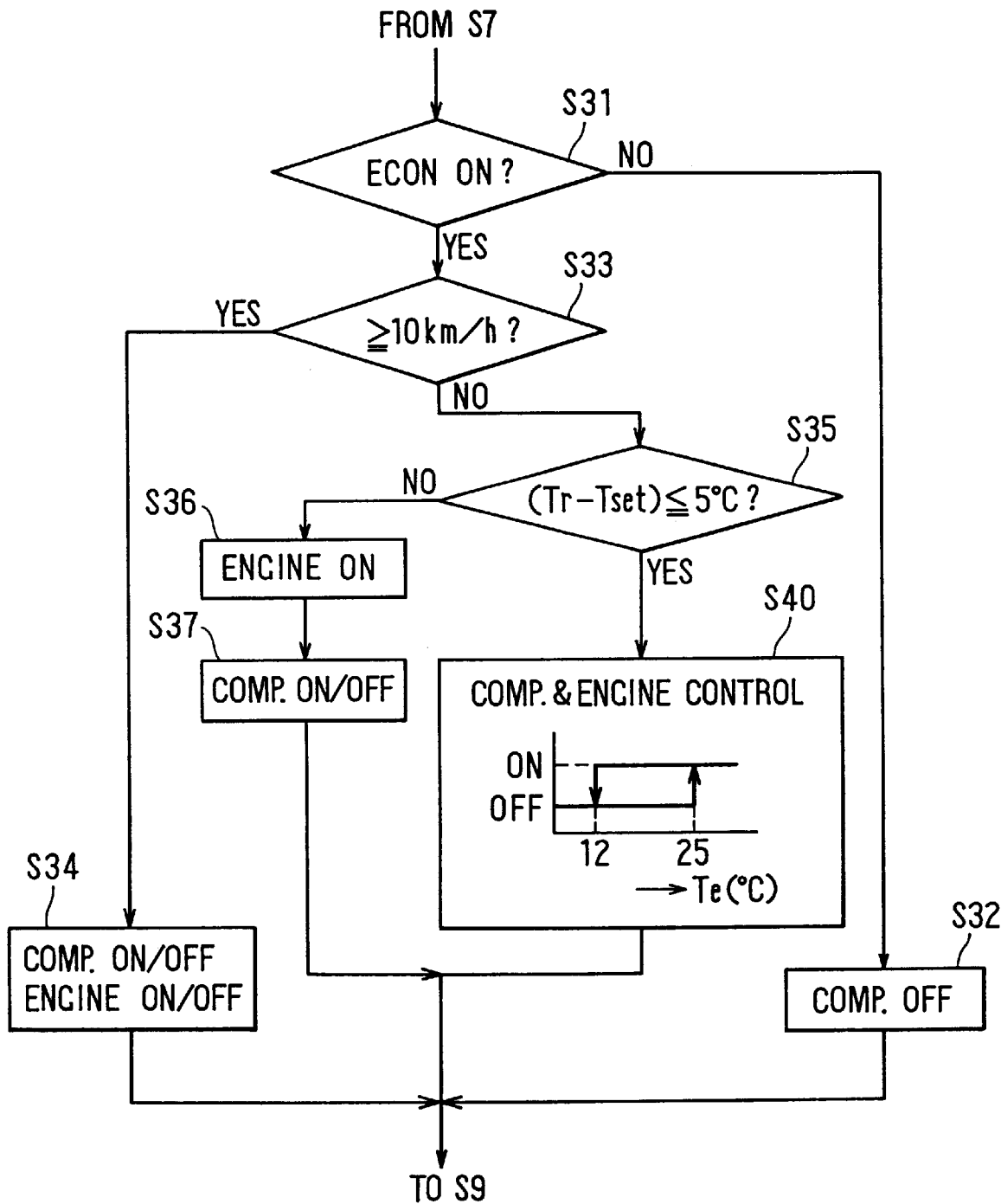
FIG. 10 is a flowchart showing a compressor control process by an air-conditioner ECU in a modification of the second embodiment.

FIG. 10 shows a modification of the second embodiment. In this modification, an additional step S40 is added to the routine and other steps are the same as those of the second embodiment. If it is judged that the cooling-down is not needed (the answer from step S35 is YES), then the routine moves to step S40. At step S40, the compressor and the engine are controlled according to the temperature Te. Namely, if Te is higher than the second turn-on temperature (25° C.), the compressor is turned on and a signal to operate the engine is delivered. If Te is lower than the turn-off temperature (12° C.), the compressor is turned off and a signal to stop the engine is delivered. Thus, even when cooling-down is not needed, the air-conditioner device is more precisely controlled to enhance passenger's comfortability without excessively sacrificing fuel economy.

A third embodiment of the present invention will be described, referring to FIG. 11 which shows a compressor control routine in step S8 shown in FIG. 5. At step S41, whether the A/C switch is ON is checked. If the A/C switch is ON, the routine moves to step S42 where the compressor and engine are controlled according to the temperature Te in a range of 3–4° C. in the same manner as in the first embodiment described above. If the A/C switch is not ON, the routine moves to step S43 where whether the ECON switch is ON or not is checked. If the answer is NO (the ECON switch is not ON), the routine moves to step S44 where signals to turn off the compressor and the engine are delivered. If the answer from step S43 is YES (the ECON switch is ON), the routine moves to step S45 where whether the hybrid vehicle is driven or not (whether the vehicle speed is higher than 10km/h) is judged. If the answer from step S45 is NO (the vehicle is not driven), the routine moves to step S47 where the compressor and the engine are controlled according to the temperature Te in a range of 12–25° C. in the same manner as in step S27 of the first embodiment. If the answer from step S45 is YES (the vehicle is driven), the routine moves to step S46 where the compressor and the engine are controlled according to the temperature Te in a range of 12–13° C. in the same manner as in step S26 of the first embodiment.

Figure 11:
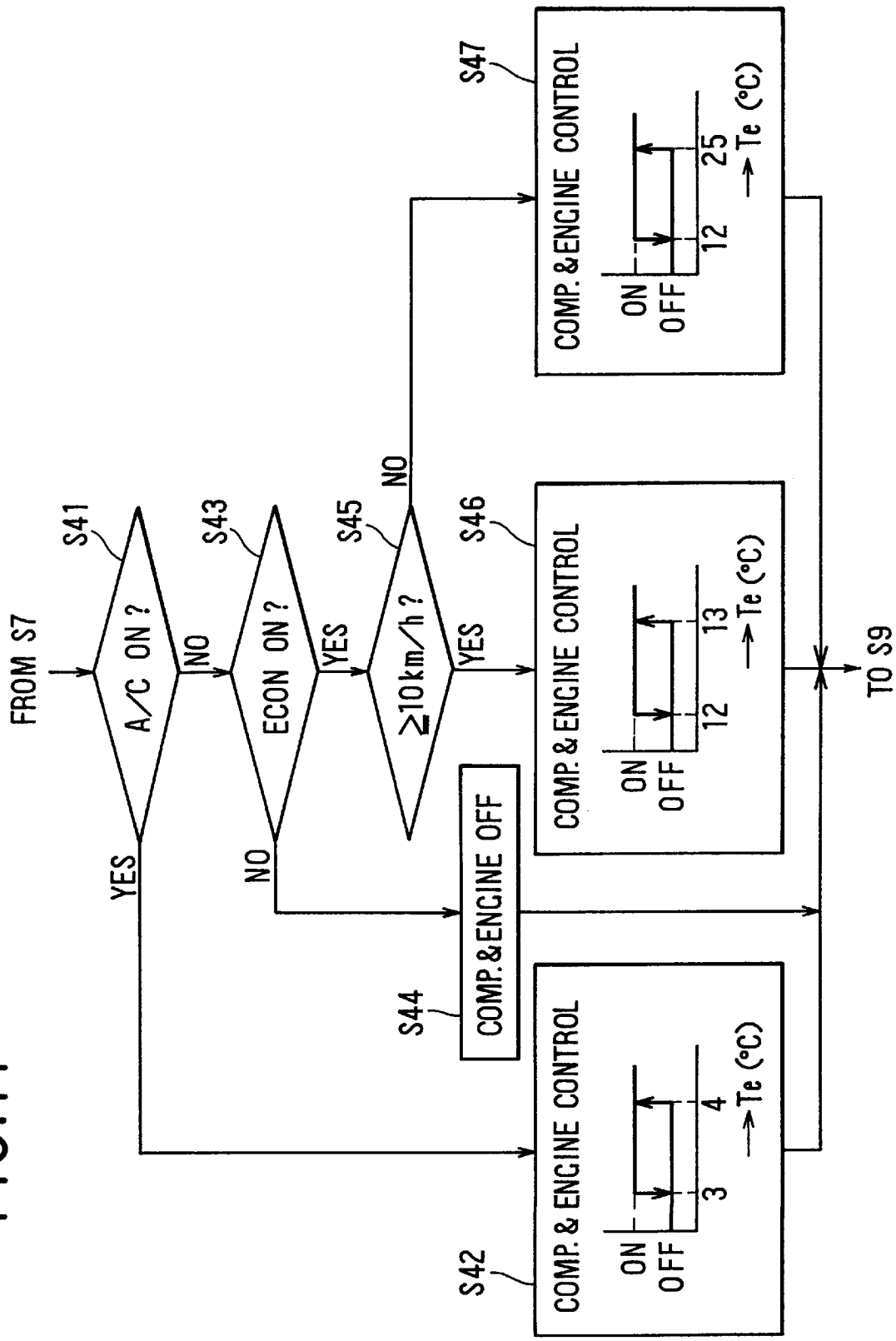
FIG. 11 is a flowchart showing a compressor control process by an air-conditioner ECU in a third embodiment of the present invention.
Figure 12:
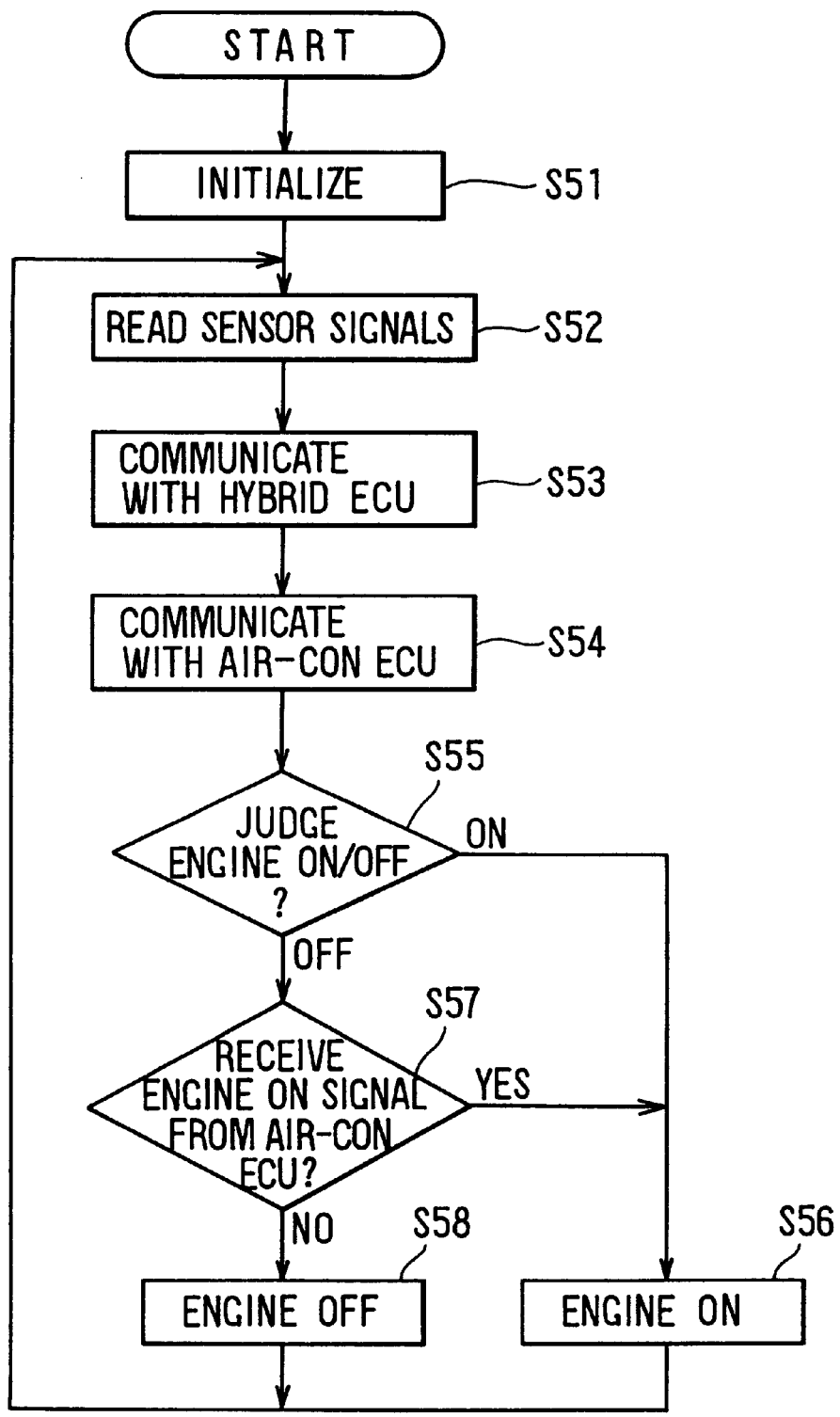
FIG. 12 is a flowchart showing a basic control process by an engine ECU in the third embodiment.

FIG. 11 shows a basic engine control process by the engine ECU 9 in the third embodiment. Signals from various sensors detecting engine operation, such as an engine speed sensor, a vehicle speed sensor, a sensor for detecting degree of throttle opening, a battery voltage sensor, and a coolant temperature sensor, are fed to the engine ECU 9. Also, signals from the air-conditioner ECU 7 and the hybrid ECU 8 are fed to the engine ECU 9. When the ignition switch is turned on and direct current power is supplied to the engine ECU 9 from the battery 4, the routine shown in FIG. 12 starts. At step S51, the engine ECU 9 is initialized. Then, at step S52, signals from sensors detecting engine operation are read. The engine ECU 9 communicates with the hybrid ECU 8 at step S53 and with the air-conditioner ECU 7 at step S54. Then, at step S55, the engine ECU 9 judges whether the engine should be operated or shut down, based on all the information received. When step S55 indicates that the engine should be operated (engine ON), the routine moves to step S56 where a signal to operate the engine is delivered. Then, the routine returns to step S52. When step S55 indicates that the engine should be shut down (engine OFF), the routine moves to step S57. Step S57 judges whether the engine ECU 9 has received a signal to operate the engine from the air-conditioner ECU 7. If the answer is NO (no signal to operate the engine), the routine moves to step S38 where a signal to stop the engine is delivered. Then, the routine returns to step S52. If the answer from step S57 is YES (there is a signal to operate the engine), the routine moves to step S56 where a signal to operate the engine is delivered. Step S57 may be modified to judge whether the engine ECU 9 has received a signal not to operate the engine from the air-conditioner ECU 7.

The third embodiment described above has following advantages. When the air-conditioning device is operated under the cooling mode (the A/C switch is ON), the compressor and the engine are controlled in a lower range of the temperature Te (3–4° C.). Therefore, the passenger compartment is quickly cooled down and the temperature therein is maintained at a comfortable level. When the air-conditioning device is operated under the economy mode (the ECON switch is ON) and the hybrid vehicle is driven, the compressor and the engine are controlled in an intermediate range of Te (12–13° C.) which is higher than that of the cooling mode. Accordingly, the compressor is operated with a lower operating ratio, and fuel consumption becomes less. Further, when the air-conditioning device is operated under the economy mode and the vehicle is not driven, the compressor and the engine are controlled in a higher range of Te (12–25° C.). This means that the compressor and the engine are operated less frequently. The engine has more chances to be turned off if it is not required to be operated for charging the battery 4. Thus, fuel economy is greatly improved without sacrificing passenger's comfortability.

Figure 13:
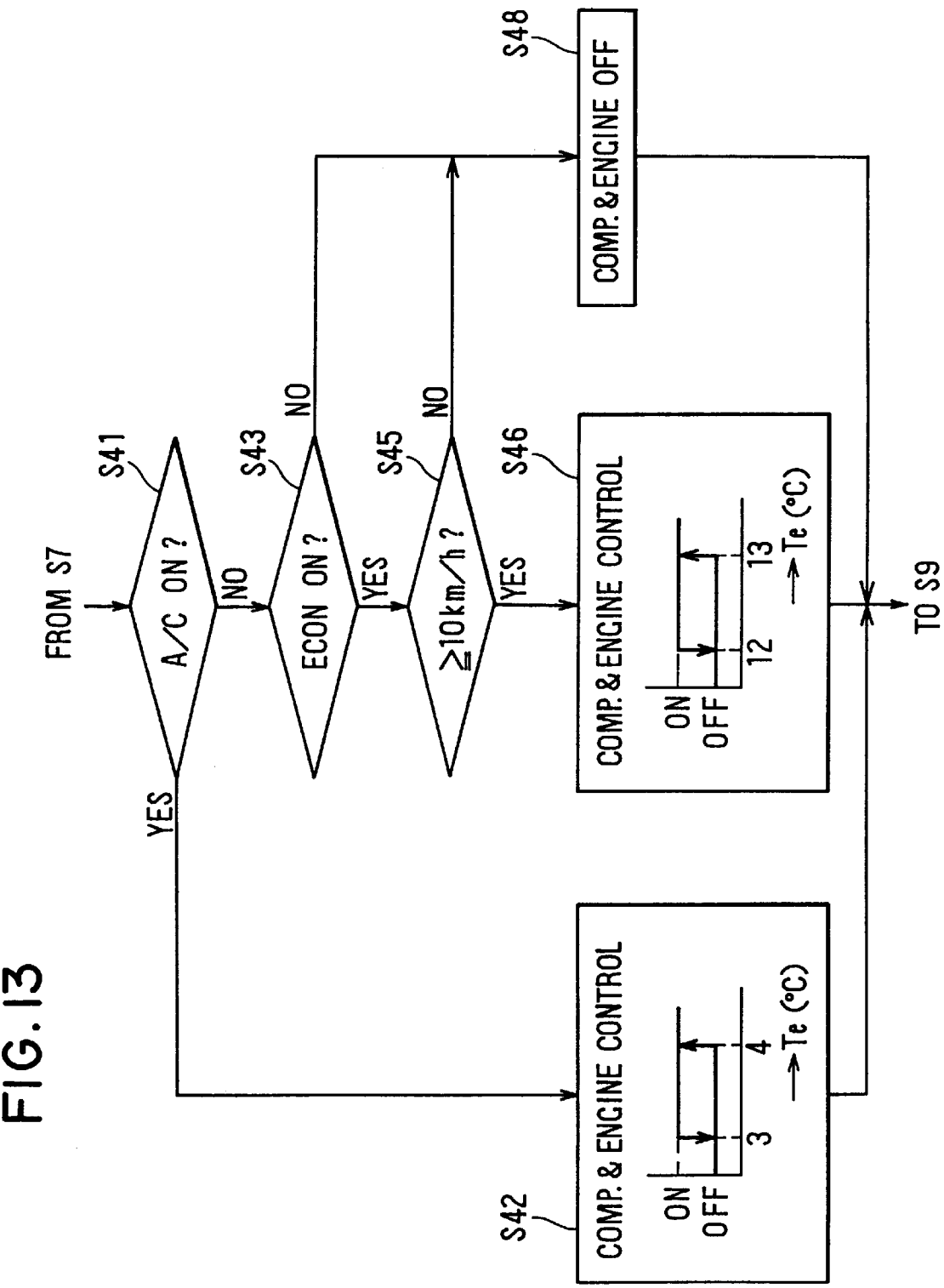
FIG. 13 is a flowchart showing a compressor control process by an air-conditioner ECU in a first modification of the third embodiment.

A first modification of the third embodiment is shown in FIG. 13, in which step S48 is employed in place of step S47 in the third embodiment shown in FIG. 11. Other steps are the same as those of the third embodiment. In this modification, when the air-conditioning device is operated under the economy mode and the vehicle is not driven, the compressor and the engine are always turned off. In this manner, fuel economy is much more improved.

Figure 14:
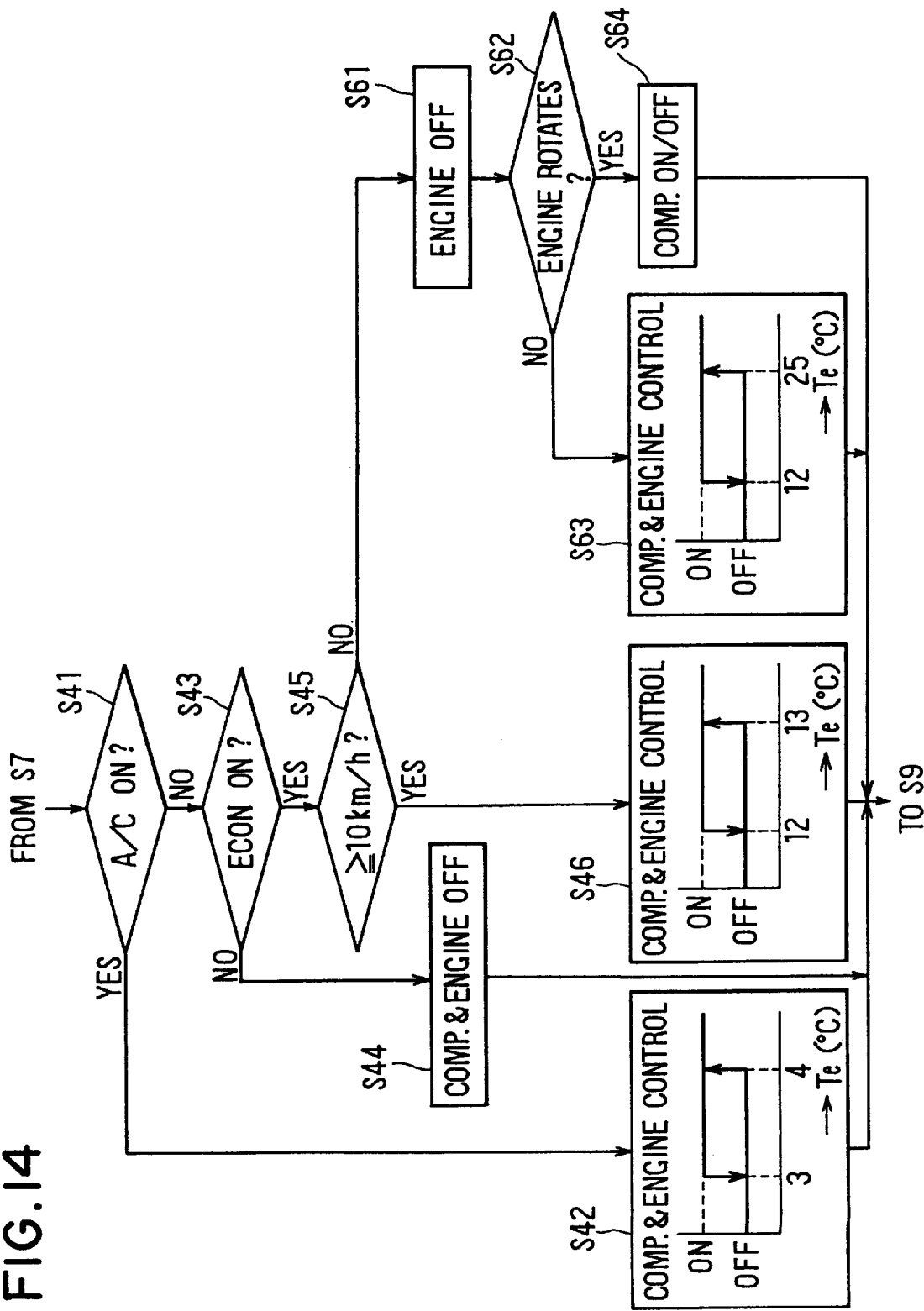
FIG. 14 is a flowchart showing a compressor control process by an air-conditioner ECU in a second modification of the third embodiment.

A second modification of the third embodiment is shown in FIG. 14, in which step S47 of the third embodiment is replaced by steps S61–S64. Other steps are the same as those of the third embodiment. When the air-conditioning device is operated under the economy mode and the vehicle is not driven, a signal to stop the engine is delivered at step S61. Then, whether the engine is now running or not is checked at step S62. The engine is usually stopped when the signal to stop the engine is delivered, but under special situations where the battery has to be charged or the coolant temperature is very low, the engine is operated. If the engine is not running (the answer of step 62 is NO), the routine moves to step S63 where the engine and compressor are controlled under ON and OFF mode according to the temperature Te in a range of 12–25° C. Namely, the compressor and engine are turned on if Te is higher than 25° C. (the second turn-on temperature) and turned off if Te is lower than 12° C. (the turn-off temperature). If the engine is running (the answer of step 62 is YES), the compressor and the engine are controlled according to Te in a lower range compared with the former situation where the engine is not running. For example, the compressor is turned on if Te is higher than 13° C. (the first turn-on temperature) and turned off if Te is lower than 12° C. (the turn-off temperature). This modification has such an advantage that the air-conditioning device operates even when the vehicle comes to a halt, in the intermediate temperature range of Te if the engine is running according to requirements other than air-conditioning, and in the higher range of Te if the engine is not running. In this manner, frosting of the windshield which often occurs when the vehicle is at halt can be effectively prevented.

Figure 15:
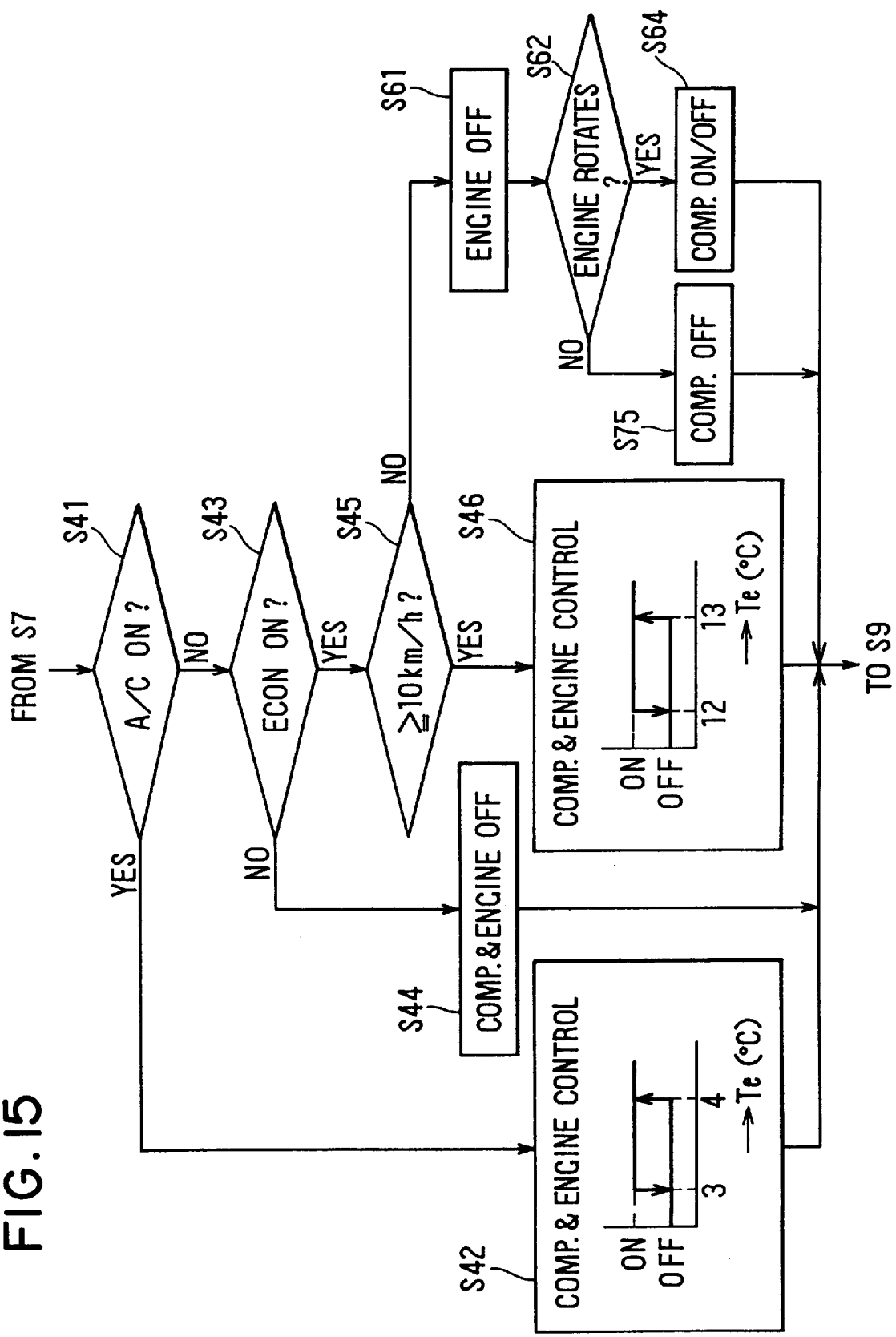
FIG. 15 is a flowchart showing a compressor control process by an air-conditioner ECU in a third modification of the third embodiment.

A third modification of the third embodiment is shown in FIG. 15, in which step S63 of the second modification is replaced by step S75. Other steps are the same as those of the second modification. In this modification, the compressor is always turned off if it is judged that the engine is not running at step S62.

Figure 16:
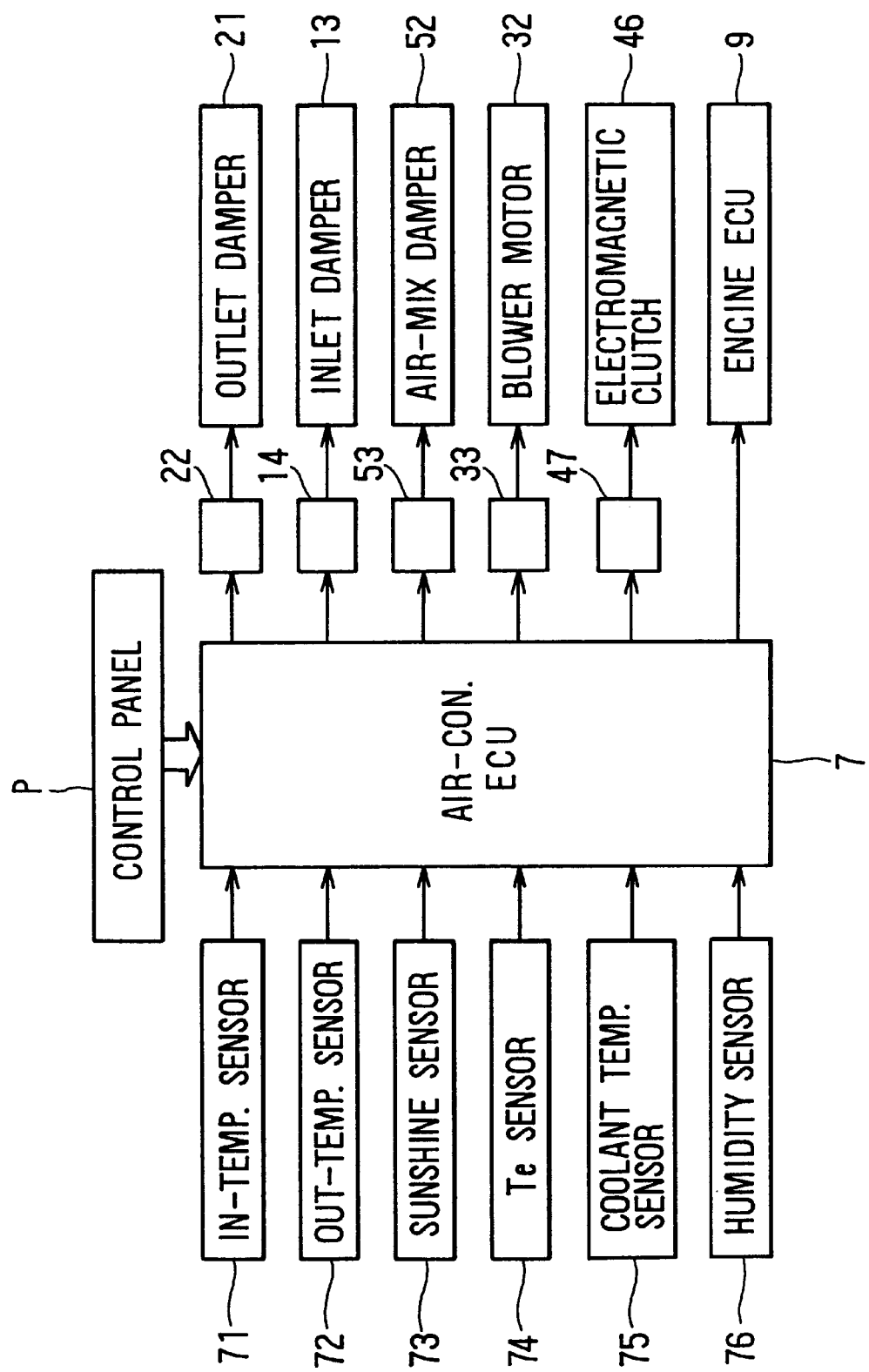
FIG. 16 is a block diagram showing a control system of the air-conditioning device as a fourth embodiment of the present invention.
Figure 17:
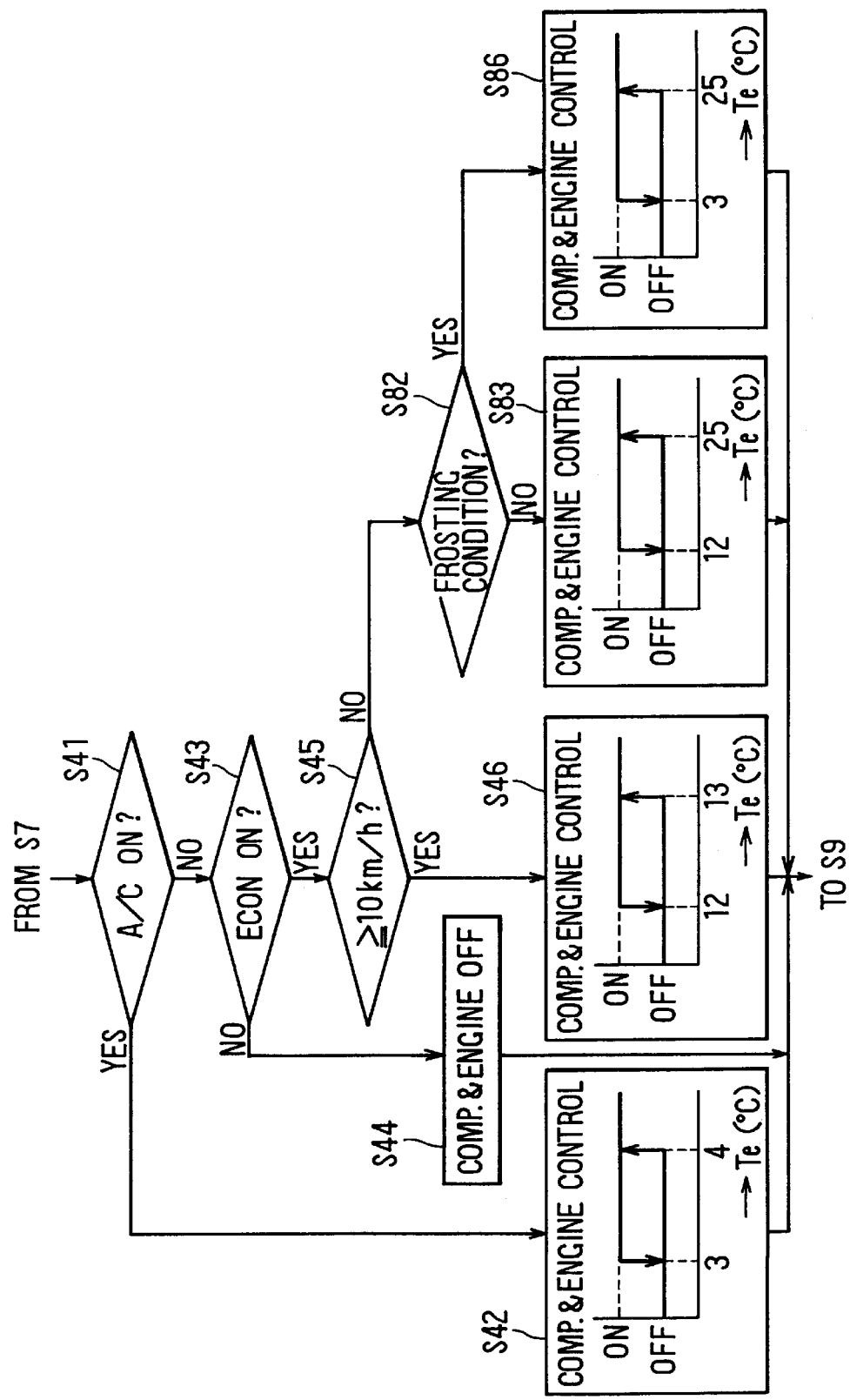
FIG. 17 is a flowchart showing a compressor control process by an air-conditioner ECU in the fourth embodiment.

Referring to FIGS. 16 and 17, a fourth embodiment will be described. In the fourth embodiment, a measure for preventing frost on the windshield is added to the foregoing embodiments. FIG. 16 is a block diagram showing a control system which is the same as that of FIG. 3, except for a humidity sensor 76 added to the group of sensors. The humidity sensor 76 detects humidity in the passenger compartment. When the humidity exceeds a predetermined level, it is judged that there exists a condition under which frost on the windshield is easily developed (frosting condition).

FIG. 17 shows a compressor control process, in which step S47 of the third embodiment shown in FIG. 11 is replaced by steps S82, S83 and S86. Other steps are the same as those of the third embodiment. When the ECON switch is ON and the vehicle is not driven (the answer from step S45 is NO), the routine moves to S82 where whether the frosting condition exists or not is judged based on a signal from the humidity sensor 76. If the frosting condition exists (the answer from step S82 is YES), the routine moves to step S86 where the compressor and engine are controlled to prevent frost development on the windshield. That is, the compressor is turned on and a signal to operate the engine is delivered, if the temperature Te is higher than 25° C. (the second turn-on temperature). The compressor and the engine are continued to be operated until Te becomes lower than 3° C. If the frosting condition does not exists (the answer from step S82 is NO), the routine moves to step S83 where the compressor and the engine are controlled in the higher range of Te (12–25° C.). In other words, the air-conditioner is operated until Te reaches 3° C. if there is the frosting condition, while it is turned off when Te reaches 12° C. if there is no frosting condition.

It is, of course, most preferable to stop the engine to save fuel and to reduce vibration and noises when the vehicle is not driven. However, if the engine is stopped and the air-conditioner is not operated for a long period when the hybrid vehicle comes to a halt, frost develops on the windshield and other windows when humidity in the passenger compartment is high. The fourth embodiment of the present invention effectively prevents development of frost on the windshield with the smallest possible consumption of fuel to drive the air-conditioning device.

Figure 18:
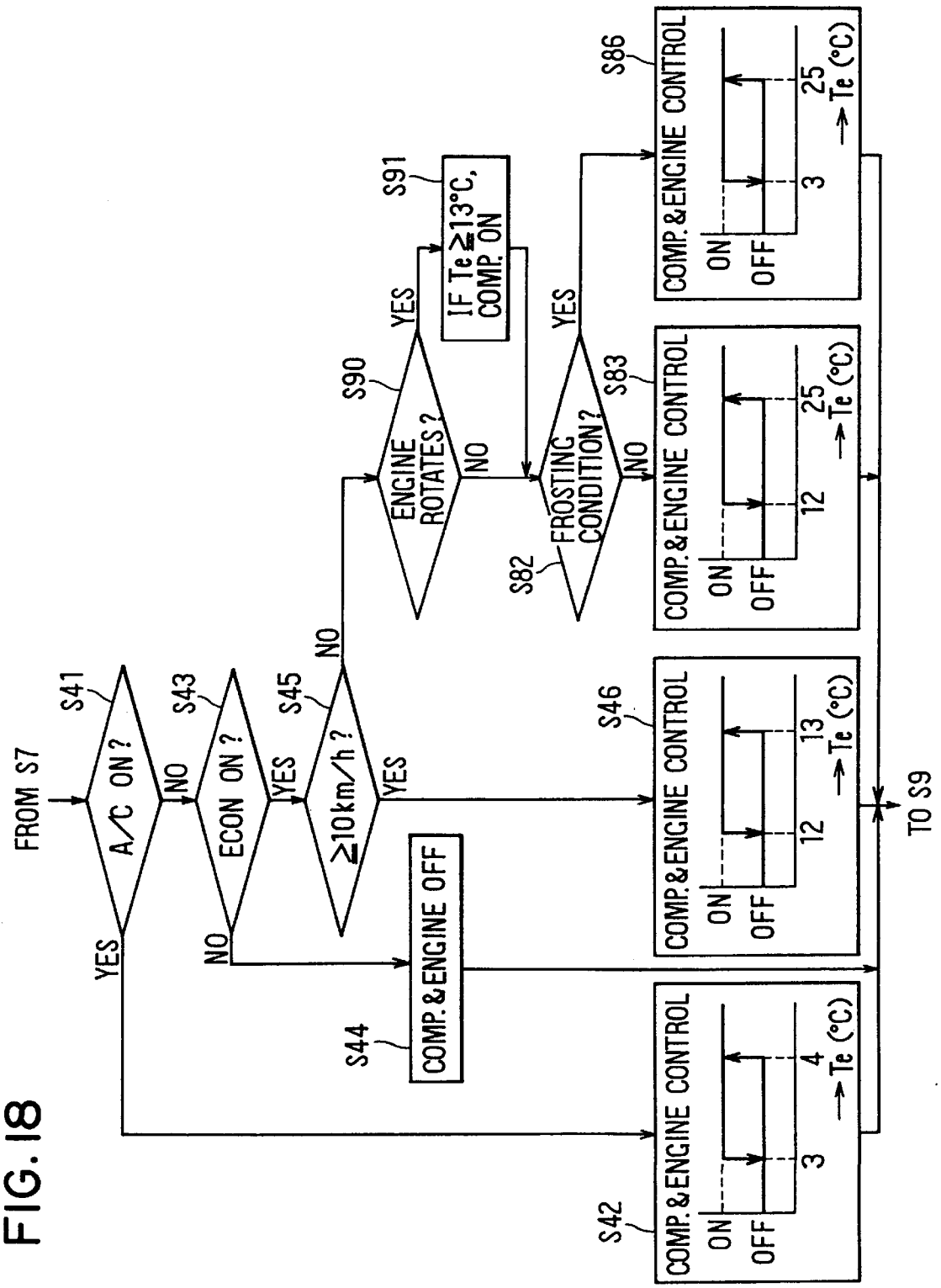
FIG. 18 is a flowchart showing a compressor control process by an air-conditioner ECU in a first modification of the fourth embodiment.

A first modification of the fourth embodiment will be described, referring to FIG. 18, in which steps 90 and 91 are added to the control routine of the fourth embodiment. Other steps are the same as those of the fourth embodiment. When the ECON switch is ON and the vehicle is not driven (the answer from step S45 is NO), the routine moves to step S90 where whether the engine is running or not is checked. When the engine is running, the routine moves to step S91 where the compressor is turned on if the temperature Te is higher than 13° C. When the engine is not running (the answer from step S90 is NO), the routine moves to step S82, and thereafter the engine and compressor are controlled in the same manner as in the fourth embodiment shown in FIG. 17. When the engine is running for charging the battery, heating the coolant or some reasons other than driving the compressor, the compressor can be additionally driven by the engine, thereby preventing frosting on the windshield, without excessively sacrificing fuel economy.

Figure 19:
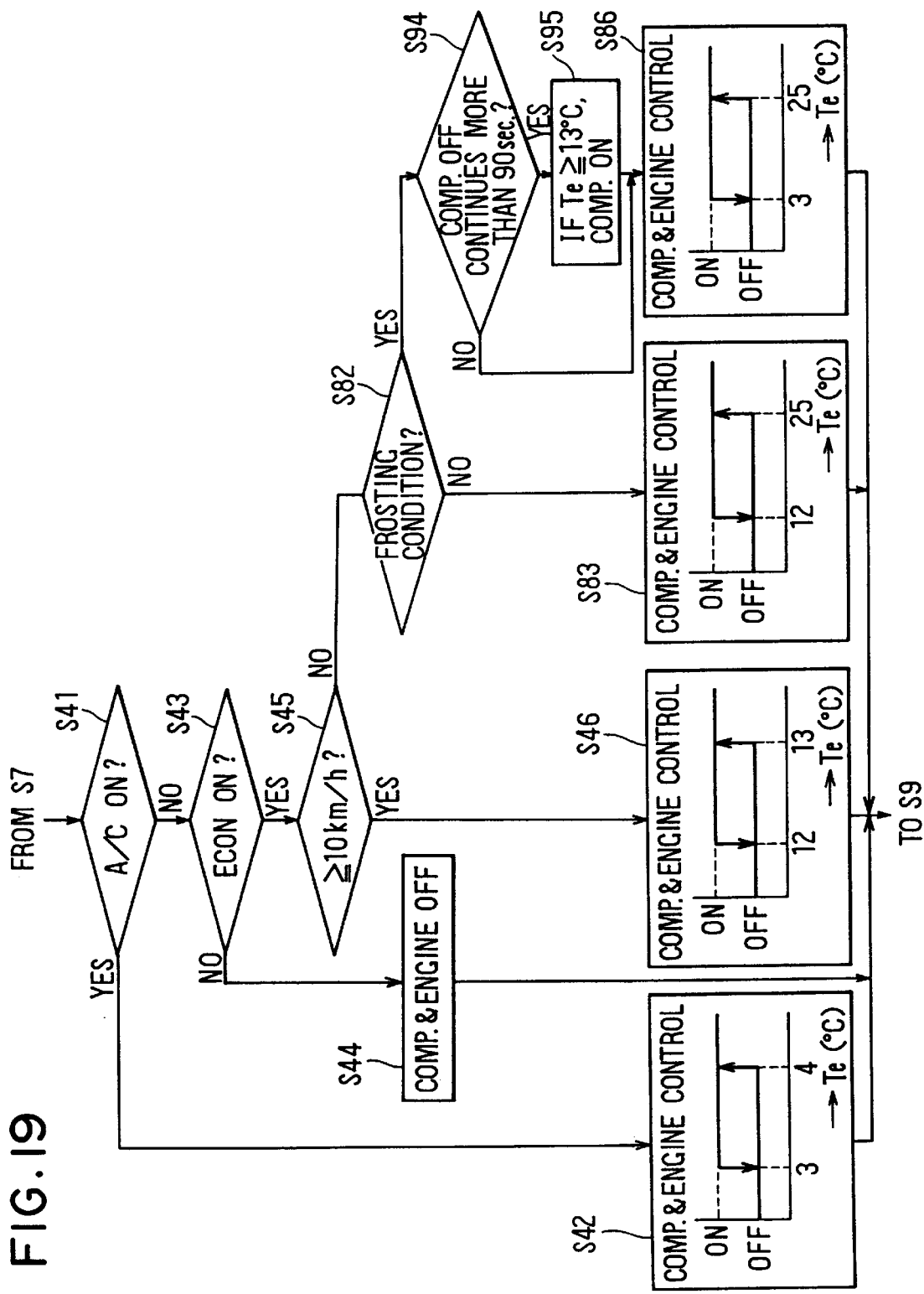
FIG. 19 is a flowchart showing a compressor control process by an air-conditioner ECU in a second modification of the fourth embodiment.

Referring to FIG. 19, a second modification of the fourth embodiment will be described. In this embodiment, steps S94 and S95 are added between step S82 and step S86 in the routine of the fourth embodiment. Other steps are the same as those of the fourth embodiment. When it is judged that the frosting condition exists (the answer from step S82 is YES), the routine moves to step S94 where whether the compressor has been turned off for more than a predetermined period, 90 sec, for example, is checked. If the answer is YES, signals to turn on the compressor and the engine are delivered if the temperature Te is higher than 13° C. If the answer from step S94 is NO, the routine moves to step S86 where the compressor and the engine are controlled in the same manner as in the fourth embodiment shown in FIG. 17. The reason why 90 sec is used as the predetermined period in this embodiment is that a vehicle does not halt for a period longer than 90 sec at an usual intersection . Only under the special occasions such as a traffic jam, a vehicle may not be driven for a longer period. If the hybrid vehicle halts and the air-conditioner does not operate for a longer period when the frosting condition exists, frost will develop on the windshield. The present embodiment avoids this situation without consuming excessive fuel for air-conditioning.

The present invention may be realized in various forms, not limited to the embodiments described above. For example, this invention may be applied to a manual air-conditioner though the embodiments described above are automatic air-conditioners. The blower 30 may be disposed in the air duct 10 though it is disposed outside the air duct 10 in the embodiments described above. Though the heater core 51 to which hot coolant is supplied is used, it may be replaced by a heat exchanger which utilizes condensing heat of refrigerant. The evaporator 45 may also be used as a condenser for heating by switching a flow direction of refrigerant in the refrigerating cycle 40. Though the compressor 41 is driven by the engine 1, it may be driven by the motor-generator 2. A compressor having a variable capacity may be used. In this case, amount of refrigerant delivered from the compressor is controlled so that the mount becomes larger when cooling-down is required and smaller when cooling-down is completed. Though the necessity of cooling-down is judged based on a difference between the compartment temperature Tr and the desired temperature Tset, it may be judged based on the temperature Tao at the outlet of the air duct 10. It may also be judged from atmospheric temperature Tam, amount of sunshine Ts, positions of the temperature setting lever 63 or the desired temperature Tset. Though the degree of cooling is judged based on the after-evaporator temperature Te, it may be judged from refrigerant temperature, refrigerant pressure or temperature of an evaporator fin. The cooling mode and the economy mode may be automatically switched depending on various signals, such as signals from the temperature setting lever 63, the air amount control lever 64, inlet control switch 62, and various sensors detecting driving conditions. Though the humidity sensor 76 is used to determine whether the frosting condition exists, that determination may be made by a computer based on combination of all or some information such as signals from the inside temperature sensor 71, the outside temperature sensor 72, sensors detecting driving conditions, the sunshine sensor 73, and information regarding the inlet modes. For this purpose, it is also possible to utilize information from a rain fall sensor and a seat sensor detecting number of passengers, if those are available.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An air-conditioning device for cooling a passenger compartment of a hybrid vehicle driven by a driving source having an internal combustion engine and an electric motor powered by an on-board battery, the air-conditioning device comprising:

a compressor driven by the driving source for compressing refrigerant in a refrigerating cycle;

an evaporator for cooling the passenger compartment by evaporating the refrigerant compressed by the compressor;

means for judging whether the passenger compartment is cooled down to a vicinity of a desired temperature; and control means for controlling operation of the compressor to reduce an operating ratio thereof after the compartment is cooled down to the vicinity of the desired temperature; wherein the compressor control means outputs a signal to operate the engine whenever it outputs a signal to operate the compressor, the compressor control means outputs a signal to stop the engine whenever it outputs a signal to turn off the compressor, irrespective of whether the compartment is cooled down to the desired temperature or not, and the signal to operate or stop the engine is fed to an engine controller which controls the engine according to the signal.

2. The air-conditioning device as in claim 1, wherein:

the compressor is operated in synchronism with operation of the driving source.

3. The air-conditioning device as in claim 1, further including means for setting the desired temperature and a sensor for detecting the compartment temperature, wherein:

it is judged that a cooling down operation by the air-conditioning device is completed when a difference between the desired temperature and the compartment temperature becomes smaller than a preset value.

4. The air-conditioning device as in claim 1, further including a detector for detecting a cooling ability of the evaporator, wherein:

the compressor is driven until the compartment is cooled down to the vicinity of the desired temperature, if the temperature at an immediate downstream of the evaporator is higher than a first predetermined temperature; and the compressor is driven after the compartment is cooled down to the vicinity of the desired temperature, if the temperature at an immediate downstream of the evaporator is higher than a second predetermined temperature which is higher than the first predetermined temperature, thereby reducing the operating ratio of the compressor.

5. The air-conditioning device as in claim 1, further including a sensor for detecting a temperature at an immediate downstream of the evaporator, wherein:

the compressor is driven until the compartment is cooled down to the vicinity of the desired temperature, if the temperature at an immediate downstream of the evaporator is higher than a first predetermined temperature; and the compressor is driven after the compartment is cooled down to the vicinity of the desired temperature, if the temperature at an immediate downstream of the evaporator is higher than a second predetermined temperature which is higher than the first predetermined temperature, thereby reducing the operating ratio of the compressor.

6. The air-conditioning device as in claim 5, further including means for switching air-conditioning modes between a cooling mode and an economy mode, wherein:

the predetermined temperature to be compared with the temperature at the immediate downstream of the evaporator are set higher under the economy mode than under the cooling mode.

7. The air-conditioning device as in claim 1, wherein the compressor has a fixed capacity.

8. An air-conditioning device for cooling a passenger compartment of a hybrid vehicle driven by a driving source having an internal combustion engine and an electric motor powered by an on-board battery, the air-conditioning device comprising:

a compressor driven by the driving source for compressing refrigerant in a refrigerating cycle;

an evaporator for cooling the passenger compartment by evaporating the refrigerant compressed by the compressor;

means for judging whether the passenger compartment is cooled down to a vicinity of a desired temperature;

control means for controlling operation of the compressor to reduce an operating ratio thereof after the compartment is cooled down to the vicinity of the desired temperature; and a sensor for detecting a temperature at an immediate downstream of the evaporator, wherein:

the compressor is driven until the compartment is cooled down to the vicinity of the desired temperature, if the temperature at an immediate downstream of the evaporator is higher than a first predetermined temperature; and the compressor is driven after the compartment is cooled down to the vicinity of the desired temperature, if the temperature at an immediate downstream of the evaporator is higher than a second predetermined temperature which is higher than the first predetermined temperature, thereby reducing the operating ratio of the compressor.

9. The air-conditioning device as in claim 8, further including means for switching air-conditioning modes between a cooling mode and an economy mode, wherein:

the predetermined temperatures to be compared with the temperature at the immediate downstream of the evaporator are set higher under the economy mode than under the cooling mode.

10. An air-conditioning device for cooling a passenger compartment of a hybrid vehicle driven by a driving source having an internal combustion engine and an electric motor powered by an on-board battery, the air-conditioning device comprising:

a compressor driven by the internal combustion engine for compressor refrigerant in a refrigerating cycle;

an evaporator for cooling the passenger compartment by evaporating the refrigerant compressed by the compressor; and control means for controlling operation of the compressor to drive the compressor in synchronism with operation of the internal combustion engine and to reduce an operating ratio of the compressor after cooling down of the compartment is completed; wherein the compressor control means outputs a signal to operate the engine whenever it outputs a signal to operate the compressor, the compressor control means outputs a signal to stop the engine whenever it outputs a signal to turn off the compressor, irrespective of whether the compartment is cooled down to the desired temperature or not, and the signal to operate or stop the engine is fed to an engine controller which controls the engine according to the signal.

11. The air-conditioning device as in claim 10, further including means for switching air-conditioning modes between a cooling mode and an economy mode, wherein:

the control means reduces the operating ratio of the compressor under the economy mode, compared with that under the cooling mode.

12. The air-conditioning device as in claim 10, further including a vehicle speed sensor and an engine controller, wherein:

the engine controller delivers a signal to stop the internal combustion engine when a vehicle speed detected by the vehicle speed sensor is lower than a predetermined level and the battery is sufficiently charged; and the control means for controlling operation of the compressor reduces the operating ratio of the compressor if the vehicle speed is lower than the predetermined level.

13. The air-conditioning device as in claim 12, further including a sensor for detecting a temperature at an immediate downstream of the evaporator, wherein:

the control means for controlling operation of the compressor turns on the compressor if the temperature at an immediate downstream of the evaporator is higher than a predetermined turn-on temperature and turns off the compressor if the temperature at an immediate downstream of the evaporator is lower than a predetermined turn-off temperature; and the predetermined turn-on temperature is set at a higher level when the vehicle speed is lower than the predetermined level.

14. The air-conditioning device as in claim 10, further including means for switching air-conditioning modes between a cooling mode and economy mode, a vehicle speed sensor and an engine controller, wherein:

the engine controller delivers a signal to stop the internal combustion engine when the vehicle speed is lower than a predetermined level; and the control means controls the compressor so that the compressor operates with a lower operating ratio as the vehicle speed becomes lower, when the air-conditioning device is operated under the economy mode.

15. An air-conditioning device for cooling a passenger compartment of a hybrid vehicle driven by a driving source having an internal combustion engine and an electric motor powered by an on-board battery, the air-conditioning device comprising:

a compressor driven by the internal combustion engine for compressor refrigerant in a refrigerating cycle;

an evaporator for cooling the passenger compartment by evaporating the refrigerant compressed by the compressor;

control means for controlling operation of the compressor to drive the compressor in synchronism with operation of the internal combustion engine and to reduce an operating ratio of the compressor after cooling down of the compartment is completed; and a vehicle speed sensor and an engine controller, wherein:
the engine controller delivers a signal to stop the internal combustion engine when a vehicle speed detected by the vehicle speed sensor is lower than a predetermined level and the battery is sufficiently charged; and the control means for controlling operation of the compressor reduces the operating ratio of the compressor if the vehicle speed is lower than the predetermined level.

16. The air-conditioning device as in claim 15, further including a sensor for detecting a temperature at an immediate downstream of the evaporator, wherein:

the control means for controlling operation of the compressor turns on the compressor if the temperature at an immediate downstream of the evaporator is higher than a predetermined turn-on temperature and turns off the compressor if the temperature at an immediate downstream of the evaporator is lower than a predetermined turn-off temperature; and the predetermined turn-on temperature is set at a higher level when the vehicle speed is lower than the predetermined level.

17. The air-conditioning device as in claim 7, further including a detector for detecting a cooling ability of the evaporator, wherein:

the control means for controlling operation of the compressor turns on the compressor if the temperature at an immediate downstream of the evaporator is higher than a predetermined turn-on temperature and turns off the compressor if the temperature at an immediate downstream of the evaporator is lower than a predetermined turn-off temperature; and the predetermined turn-on temperature is set at a higher level when the vehicle speed is lower than the predetermined level.

18. An air-conditioning device for cooling a passenger compartment of a hybrid vehicle driven by a driving source having an internal combustion engine and an electric motor powered by an on-board battery, the air-conditioning device comprising:

a compressor driven by the internal combustion engine for compressor refrigerant in a refrigerating cycle;

an evaporator for cooling the passenger compartment by evaporating the refrigerant compressed by the compressor;

control means for controlling operation of the compressor to drive the compressor in synchronism with operation of the internal combustion engine and to reduce an operating ratio of the compressor after cooling down of the compartment is completed; and means for switching air-conditioning modes between a cooling mode and economy mode, a vehicle speed sensor and an engine controller, wherein:
the engine controller delivers a signal to stop the internal combustion engine when the vehicle speed is lower than a predetermined level; and the control means controls the compressor so that the compressor operates with a lower operating ratio as the vehicle speed becomes lower, when the air-conditioning device is operated under the economy mode.

19. An air-conditioning device for cooling a passenger compartment of a hybrid vehicle driven by a driving source having an internal combustion engine and an electric motor powered by an on-board battery, the air-conditioning device comprising:

a compressor driven by the driving source for compressing refrigerant in a refrigerating cycle;

an evaporator for cooling the passenger compartment by evaporating the refrigerant compressed by the compressor;

means for judging whether the passenger compartment is cooled down to a vicinity of a desired temperature; and control means for controlling operation of the compressor to reduce an operating ratio thereof after the compartment is cooled down to the vicinity of the desired temperature; wherein the compressor control means outputs a signal to turn on or off the compressor when the engine is being operated during the period in which the passenger compartment is being cooled down, and the compressor control means outputs a signal to turn off the compressor after the compartment has been cooled down to the desired temperature, and the engine operation is controlled by an engine controller according to the signal fed from the compressor control means.

20. The air-conditioning device as in claim 19, wherein: the compressor is operated in synchronism with operation of the driving source.

21. The air-conditioning device as in claim 19, further including means for setting the desired temperature and a sensor for detecting the compartment temperature, wherein: it is judged that a cooling down operation by the air-conditioning device is completed when a difference between the desired temperature and the compartment temperature becomes smaller than a preset value.

22. The air-conditioning device as in claim 19, wherein the compressor has a fixed capacity.

23. An air-conditioning device for cooling a passenger compartment of a hybrid vehicle driven by a driving source having an internal combustion engine and an electric motor powered by an on-board battery, the air-conditioning device comprising:
   a compressor driven by the driving source for compressing refrigerant in a refrigerating cycle;
   an evaporator for cooling the passenger compartment by evaporating the refrigerant compressed by the compressor;
   means for judging whether the passenger compartment is cooled down to a vicinity of a desired temperature; and
   control means for controlling operation of the compressor to reduce an operating ratio thereof after the compartment is cooled down to the vicinity of the desired temperature; wherein
      the compressor control means outputs a signal to turn on or off the compressor when the engine is being operated during the period in which the passenger compartment is being cooled down;
      the compressor control means outputs a signal to operate the engine when it outputs a signal to turn on the compressor while it outputs a signal to stop the engine when it outputs a signal to turn off the compressor, after the compartment has been cooled down to the desired temperature; and
      the engine operation is controlled by an engine controller according to the signal fed from the compressor control means.

24. The air-conditioning device as in claim 23, further including a sensor for detecting a temperature at an immediate downstream of the evaporator, wherein:
   the compressor is driven until the compartment is cooled down to the vicinity of the desired temperature, if the temperature at an immediate downstream of the evaporator is higher than a first predetermined temperature; and
   the compressor is driven after the compartment is cooled down to the vicinity of the desired temperature, if the temperature at an immediate downstream of the evaporator is higher than a second predetermined temperature which is higher than the first predetermined temperature, thereby reducing the operating ratio of the compressor.

25. The air-conditioning device as in claim 24, further including means for switching air-conditioning modes between a cooling mode and an economy mode, wherein:
   the predetermined temperature to be compared with the temperature at the immediate downstream of the evaporator are set higher under the economy mode than under the cooling mode.

26. The air-conditioning device as in claim 23, wherein: the compressor is operated in synchronism with operation of the driving source.

27. The air-conditioning device as in claim 23, further including means for setting the desired temperature and a sensor for detecting the compartment temperature, wherein:
   it is judged that a cooling down operation by the air-conditioning device is completed when a difference between the desired temperature and the compartment temperature becomes smaller than a preset value.

28. The air-conditioning device as in claim 23, wherein the compressor has a fixed capacity.

29. An air-conditioning device for cooling a passenger compartment of a hybrid vehicle driven by a driving source having an internal combustion engine and an electric motor power by an on-board battery, the air-conditioning device comprising:
   a compressor driven by the internal combustion engine for compressing refrigerant in a refrigerating cycle;
   an evaporator for cooling the passenger compartment by evaporating the refrigerant compressed by the compressor; and
   control means for controlling operation of the compressor to drive the compressor in synchronism with operation of the internal combustion engine and to reduce an operating ratio of the compressor after cooling down of the compartment is completed; wherein
      the compressor control means outputs a signal to turn on or off the compressor when the engine is being operated during the period in which the passenger compartment is being cooled down;
      the compressor control means outputs a signal to operate the engine when it outputs a signal to operate the engine when it outputs a signal to turn on the compressor while it outputs a signal to stop the engine when it outputs a signal to turn off the compressor, after the compartment has been cooled down to the desired temperature; and
      the engine operation is controlled by an engine controller according to the signal fed from the compressor control means.

30. The air-conditioning device as in claim 29, further including a vehicle speed sensor and an engine controller, wherein:
   the engine controller delivers a signal to stop the internal combustion engine when a vehicle speed detected by the vehicle speed sensor is lower than a predetermined level and the battery is sufficiently charged; and
   the control means for controlling operation of the compressor reduces the operating ratio of the compressor if the vehicle speed is lower than the predetermined level.

31. The air-conditioning device as in claim 30, further including a sensor for detecting a temperature at an immediate downstream of the evaporator, wherein:
   the control means for controlling operation of the compressor turns on the compressor if the temperature at an immediate downstream of the evaporator is higher than a predetermined turn-on temperature and turns off the compressor if the temperature at an immediate downstream of the evaporator is lower than a predetermined turn-off temperature; and
   the predetermined turn-on temperature is set at a higher level when the vehicle speed is lower than the predetermined level.

32. The air-conditioning device as in claim 29, further comprising including means for switching air-conditioning modes between a cooling mode and an economy mode, wherein:

the control means reduces the operating ratio of the compressor under the economy mode, compared with that under the cooling mode.

33. The air-conditioning device as in claim 29, further including means for switching air-conditioning modes between a cooling mode and economy mode, a vehicle speed sensor and an engine controller, wherein:

the engine controller delivers a signal to stop the internal combustion engine when the vehicle speed is lower than a predetermined level; and the control means controls the compressor so that the compressor operates with a lower operating ratio as the vehicle speed becomes lower, when the air-conditioning device is operated under the economy mode.

34. The air-conditioning device as in claim 29, wherein the compressor has a fixed capacity.

* * * * *